United States Patent
Zhang et al.

(10) Patent No.: US 11,935,302 B2
(45) Date of Patent: Mar. 19, 2024

(54) OBJECT RE-IDENTIFICATION USING MULTIPLE CAMERAS

(71) Applicants: NANYANG TECHNOLOGICAL UNIVERSITY, Singapore (SG); NCS PTE. LTD., Singapore (SG)

(72) Inventors: Guoqing Zhang, Singapore (SG); Weisi Lin, Singapore (SG); Arun Kumar Chandran, Singapore (SG); Xuan Jing, Singapore (SG)

(73) Assignees: NANYANG TECHNOLOGICAL UNIVERSITY, Singapore (SG); NCS PTE. LTD., Singapore (SG)

( * ) Notice: Subject to any disclaimer, the term of this patent is extended or adjusted under 35 U.S.C. 154(b) by 113 days.

(21) Appl. No.: 17/790,399

(22) PCT Filed: Dec. 29, 2020

(86) PCT No.: PCT/SG2020/050789
§ 371 (c)(1),
(2) Date: Jun. 30, 2022

(87) PCT Pub. No.: WO2021/137763
PCT Pub. Date: Jul. 8, 2021

(65) Prior Publication Data
US 2023/0075888 A1    Mar. 9, 2023

(30) Foreign Application Priority Data
Dec. 30, 2019   (SG) .............................. 10201913787T

(51) Int. Cl.
*G06V 20/52*  (2022.01)
*G06V 10/46*  (2022.01)
(Continued)

(52) U.S. Cl.
CPC ............. *G06V 20/52* (2022.01); *G06V 10/462* (2022.01); *G06V 10/761* (2022.01); *G06V 10/771* (2022.01); *G06V 2201/07* (2022.01)

(58) Field of Classification Search
CPC .... G06V 20/52; G06V 10/462; G06V 10/761; G06V 10/771; G06V 2201/07; G06F 18/2115; G06F 18/22
See application file for complete search history.

(56) References Cited

U.S. PATENT DOCUMENTS 11,062,147 B2 * 7/2021 Mirza ..................... G06T 7/277
2018/0373929 A1  12/2018 Ye
(Continued)

FOREIGN PATENT DOCUMENTS

| CN | 107358200 A | 11/2017 |
|----|-------------|---------|
| CN | 107679461 A | 2/2018  |
| CN | 109409201 A | 3/2019  |

OTHER PUBLICATIONS

International Search Report for PCT/SG2020/050789 (ISA/SG) dated Mar. 23, 2021 (4 pages).

(Continued)

*Primary Examiner* — Oschta I Montoya
(74) *Attorney, Agent, or Firm* — ALSTON & BIRD LLP

(57) ABSTRACT

In some aspects, a method for object re-identification may include obtaining a first set of images from a first camera, and a second set of images from at least one second camera; determining a first set of features based on the first set of images, the first set of features lying in a first feature space; and determining a second set of features based on the second set of images, the second set of features lying in a second feature space. The method may additionally include determining a first feature projection matrix and a second feature projection matrix that respectively map the first set of (Continued)

features and the second set of features to a shared feature space; and determining a common dictionary based on the shared feature space.

16 Claims, 24 Drawing Sheets

(51) Int. Cl.
G06V 10/74 (2022.01)
G06V 10/771 (2022.01)

(56) References Cited

U.S. PATENT DOCUMENTS

| | | | | |
|---|---|---|---|---|
| 2019/0108423 | A1* | 4/2019 | Jones | G06V 40/172 |
| 2019/0171905 | A1* | 6/2019 | Ye | G06V 40/161 |
| 2019/0206077 | A1* | 7/2019 | Paik | G06V 10/464 |
| 2020/0218888 | A1* | 7/2020 | Gong | G06V 40/173 |
| 2020/0226421 | A1* | 7/2020 | Almazan | G06N 3/045 |
| 2020/0302186 | A1* | 9/2020 | Yang | G06F 18/29 |
| 2021/0073563 | A1* | 3/2021 | Karianakis | G06V 20/41 |
| 2021/0150268 | A1* | 5/2021 | Wang | G06N 3/045 |
| 2021/0312642 | A1* | 10/2021 | Zhang | G06N 20/00 |

OTHER PUBLICATIONS

Written Opinion for PCT/SG2020/050789 (ISA/SG) dated Mar. 23, 2021 (4 pages).
Zhu, X et al., *Semi-supervised Cross-view Projection-based Dictionary Learning for Video-Based Person Re-Identification*, IEEE Transactions on Circuits and Systems for Video Technology, Jun. 21, 2017, vol. 28, No. 10.
S. Li, M. Shao, and Y. Fu, "Person Re-identification by Cross-view multi-level dictionary learning," *IEEE TPAMI*, vol. 40, No. 12, pp. 2963-2977, 2018.
G. Gray, S. Brennan, and H. Tao, "Evaluating appearance models for recognition, reacquisition, and tracking," in Proc. Int. Conf. Privacy Enhancing Technol., 2007, pp. 1-7.
R. Zhao, W. Ouyang, and X. Wang, "Learning mid-level filters for person re-identification," *in Proc. IEEE Conf. Comput. Vis. Pattern Recognit.*, 2014, pp. 144-151.
C. C. Loy, T. Xiang, and S. Gong, "Multi-camera activity correlation analysis," *in Proc. IEEE Conf. Comput. Vis. Pattern Recognit.*, 2009, pp. 1988-1995.
Y. Cheng, X. Zhu, W. Zheng, and J. Lai, "Person re-identification by camera correlation aware feature augmentation," *IEEE TPAMI*, vol. 40, No. 2, pp. 392-408, 2018.
M. Tian, S. Yi, H. Li, S. Li, X. Zhang, J. Shi, J. Yan, and X. Wang, "Eliminating background-bias for robust person re-identification," *in Proc. IEEE Conf. Comput. Vis. Pattern Recognit.*, 2018, pp. 5794-5803.
T. Wang, S. Gong, X. Zhu, S. Wang, Person re-identification by video ranking, in Proc. Eur. Conf. Comput. Vis., 2014, pp. 688-703.
P. M. Roth, M. irzer, M. Koestinger, C. Beleznai, and H. Bischof, Mahalanobis distance learning for person re-identification, in Person Re-Identification. London, U.K.: Springer, 2014, pp. 247-267.
R. Zhao, W. Oyang, and X. Wang, Person re-identification by saliency learning, IEEE Trans. Pattern Anal. Mach. Intell., vol. 39, No. 2, pp. 356-370, 2017.
Y. C. Chen, W. S. Zheng, and J. Lai, "Mirror representation for modeling view-specific transform in person re-identification," in Proc. Int. Joint Conf. Artif. Intell., 2015, pp. 3402-3408.
N. Martinel, C. Micheloni, C. Piciarelli, Distributed signature fusion for person re-identification, in Proc. IEEE Conf. Distrbuted Smart Cameras., 2012, pp. 1-6.
Ahmed, E.; Jones, M.; and Marks, T. K. 2015. An improved deep learning architecture for person re-identification. In Proc. of CVPR.
Chen, D.; Yuan, Z.; Hua, G.; Zheng, N.; and Wang, J. 2015. Similarity learning on an explicit polynomial kernel feature map for person re-identification. In Proc. of CVPR.

Chen, J.; Zhang, Z.; and Wang, Y. 2015. Relevance metric learning for person re-identification by exploiting listwise similarities. IEEE Transactions on Image Processing.
Deng, W.; Zheng, L.; Ye, Q.; Kang, G.; Yang, Y.; and Jiao, J. 2018. Image-image domain adaptation with preserved self-similarity and domain-dissimilarity for person re-identification. In Proc. of CVPR.
Gray, D.; and Tao, H. 2008. Viewpoint invariant pedestrian recognition with an ensemble of localized features. In Proc. of ECCV.
Gu, S.; Zhang, L.; Zuo, W.; and Feng, X. 2014. Projective dictionary pair learning for pattern classification. In Proc. Of NIPS.
Kodirov, E.; Xiang, T.; and Gong, S. 2015. Dictionary learning with iterative laplacian regularisation for unsupervised person re-identification. In Proc. of BMVC.
Li, J.; Ma, A. J.; and Yuen, P. C. 2018a. Semi-supervised region metric learning for person re-identification. International Journal of Computer Vision.
Li, K.; Ding, Z.; Li, S.; and F, Yu. 2018c. Discriminative semi-coupled projective dictionary learning for low resolution person re-identification. In Proc. of AAAI.
Li, S.; Bak, S.; Carr, P.; and Wang, X. 2018. Diversity regularized spatiotemporal attention for video-based person reidentification. In Proc. of CVPR.
Li, S.; Shao, M.; and Fu, Y. 2015. Cross-view projective dictionary learning for person re-identification. In Proc. of AAAI.
Liu, X.; Song, M.; Tao, D.; Zhou, X.; Chen, C.; and Bu, J. 2014. Semi-supervised coupled dictionary learning for person re-identification. In Proc. of CVPR.
Liao, S.; and Li, S. Z. 2015. Efficient PSD constrained asymmetric learning for person re-identification. In Proc. of ICCV.
Liao, S.; Hu, Y.; Zhu, X.; and Li, S. Z. 2015. Person reidentification by local maximal occurrence representation and metric learning. In Proc. of CVPR.
Layne, R.; Hospedales, T. M.; and Gong, S. 2012. Person re-identification by attributes. In Proc. of BMVC.
Matsukawa, T.; Okabe, T.; Suzuki, E.; and Sato, Y. 2016. Hierarchical gaussian descriptor for person re-identification. In Proc. of CVPR.
Paisitkriangkrai, S.; Shen, C.; and van den Hengel, A. 2015. Learning to rank in person re-identification with metric ensembles. In Proc. of CVPR.
Shekhar, S; Patel, V. M; Nguyen, H. V.; and Chellappa, R. 2015. Coupled projections for adaptation of dictionary. IEEE Transactions on Image Processing.
Wei, L.; Zhang, S.; Gao, W.; and Tian, Q. 2018. Person transfer gan to bridge domain gap for person reidentification. In Proc. of CVPR.
Wojke, N,; and Bewley, A. 2018. Deep cosine metric learning for person re-identification. In Proc. of WACV.
Wu, Y.; Lin, Y.; Dong, X.; Yan, Y.; Ouyang, W.; and Yang, Y. 2018. Exploit the unknown gradually: One-shot videobased person re-identification by stepwise learning. In Proc. of CVPR.
Xu, J.; Zhao, R.; Zhu, F.; Wang, H.; and Ouyang, W. 2018. Attention-aware compositional network for person reidentification. In Proc. of CVPR.
Yang, Y.; Wen, L.; Lyu, S.; and Li, S. Z. 2017. Unsupervised learning of multi-level descriptors for person reidentification. In Proc. of AAAI.
Yang, Y.; Yang, J.; Yan, J.; Liao, S.; Yi, D.; and Li, S. Z. 2014. Salient color names for person re-identification. In Proc. of ECCV.
Yu, H.; Wu, A.; and Zheng, W. S. 2017. Cross-view asymmetric metric learning for unsupervised person reidentification. In Proc. of ICCV.
Zhu, X.; Jing, X.-Y.; You, X.; Zhang, X.; and Zhang, T. 2018. Video-based person re-identification by simultaneously learning intra-video and inter-video distance metrics. IEEE Transactions on Image Processing.
Zhao, R.; Ouyang, W.; and Wang, X. 2013. Person reidentification by salience matching. In Proc. of ICCV.
Zhou, Q .; Zheng, S.; Ling, H.; Su, H.; and Wu, S. 2017. Joint dictionary learning and metric learning for person re-identification. Pattern Recognition. Zhang, R.; Lin, L.; Zhang, R.; Zuo, W.; and Zhang. L. 2015. Bit-scalable deep hashing with regularized simi-

(56) References Cited

OTHER PUBLICATIONS larity learning for image retrieval and person re-identification. IEEE Transactions on Image Processing.

* cited by examiner

806

2000

2001

OBJECT RE-IDENTIFICATION USING MULTIPLE CAMERAS

CROSS-REFERENCE TO RELATED APPLICATIONS

This application is a national phase entry of International Application No. PCT/SG2020/050789, filed Dec. 29, 2020, which claims priority to Singapore Patent Application No. 10201913787T filed on 30 Dec. 2019 and entitled "Object Re-Identification Using Multiple Cameras," the content of which are hereby incorporated by reference in their entirety.

TECHNICAL FIELD

The present disclosure generally relates to object re-identification using multiple cameras.

BACKGROUND

Object re-identification (re-ID) from multiple cameras has attracted much interest in computer vision and in numerous public safety applications. For example, due to heightened security measures in recent years, a growing number of video surveillance devices are deployed in public venues. As an important component of many automatic video surveillance systems, object re-ID (e.g., person re-ID) has attracted widespread interest and been applied in many application domains, such as suspect tracking in public safety, shopping pattern discovery in the retail sector, and outpatient movement analysis in health care.

Given an image or video of an object collected from one camera, the task of object re-ID is to find the object's image in a different camera with a different (e.g., non-overlapping) view. However, object re-ID is confronted with great challenges in real-world scenarios. For example, surveillance cameras deployed in cities collect massive amounts of surveillance images or videos every day, and it is impractical (and nearly impossible) to manually identify the object across multiple cameras. Furthermore, videos or images are usually collected by cameras with large fields-of-view, resulting in images having low resolution. Such low-resolution images complicate the acquisition of discriminative features or cues that may aid in object re-ID (e.g., biometric features or cues such as face and gait features in the case of person re-ID). As a result, visual appearances (e.g., that are devoid of discriminative features) may need to be used in the task of person re-ID.

Furthermore, the multiple cameras are deployed in different, uncontrolled environments. As such, the multiple cameras experience different environmental conditions (e.g., illumination, occlusion, viewpoint, and background), which in turn can result in substantial visual ambiguities among the various images collected from the multiple cameras. These visual ambiguities can manifest themselves as high image similarities for different objects (e.g., persons) observed from different cameras or views. The visual ambiguities can also manifest themselves as low image similarities for the same object (e.g., same person) observed from different cameras or views. These visual ambiguities are exacerbated when the objects observed are persons (e.g., due to the non-right nature of the human body). In the case of person re-ID, the high similarities among the images and features of different persons observed from different cameras or views may be referred to as high inter-person similarity or low inter-person discrimination (also referred to as low inter-person diversity or low inter-person divergence), and the low similarities among the images or features of the same person observed from different cameras or views may be referred to as low intra-person similarity or high intra-person diversity (also referred to as high intra-person divergence).

In general, object re-ID includes the operations of object (e.g., person) detection, feature transformation, similarity estimation, and object matching. Various techniques have been proposed for object re-ID and specifically for the task of person re-ID. These techniques can be broadly divided into the following categories: metric learning techniques; feature representation techniques; deep learning-based techniques; and dictionary learning techniques.

In metric learning, an objective is to find a distance metric in which the features of the same object (e.g., person) have the highest similarity, while the features of different objects (e.g., persons) have the highest dissimilarity. Example metric learning techniques include the Logistic Discriminant-based Metric Learning (LDML) technique, the Information Theoretic Metric Learning (ITML) technique, the "Keep It Simple and Straightforward MEtric" (KISSME) technique, and the Large Margin Nearest Neighbor (LMNN) technique, all of which have been applied to the specific task of person re-ID. In particular, the KISSME technique calculates the difference between between-class and within-class covariance metrics. Inspired by the KISSME technique, several other metric learning techniques have also been developed for the task of person re-ID, examples being the Local Fisher Discriminant Analysis (LFDA) technique, the Cross-view Quadratic Discriminant Analysis (XQDA) technique, and the Metric Learning by Accelerated Proximal Gradient (MLAPG) technique. Existing metric learning techniques, however, still suffer from low inter-person discrimination and high intra-person diversity, which negatively affect similarity estimation and object matching, especially for the task of person re-ID.

In feature learning, an objective is to learn expressive and reliable visual features between two images from different cameras. In many visual learning tasks, extracting expressive representations can be an important step. Feature learning techniques can achieve better performance than metric learning techniques through judiciously designing various feature extractors. Some high performing features include attributes, salient color features, mid-level feature maps, salience features, and polynomial kernel feature maps. However, like existing metric learning techniques, existing feature learning techniques also suffer from low inter-person discrimination and high intra-person diversity, which negatively affect similarity estimation and object matching, especially for the task of person re-ID.

In deep learning-based techniques, although there are merits to this approach, a major disadvantage of applying deep techniques to the task of person re-ID is that the size of the training data is limited. For example, in many re-ID datasets, each person is only associated with two images, which can be insufficient for training complex deep learning networks. Consequently, deep learning-based techniques trained on small-scale datasets do not provide sufficiently accurate similarity estimation and object matching. While training deep learning-based techniques using a large dataset is an option, deep learning-based techniques can require millions of images and thousands of classes to train the deep learning-based techniques.

Dictionary learning has been widely used in various computer vision applications such as face recognition and object classification. Dictionary learning techniques have also been proposed for object re-ID, an example dictionary learning technique being the cross-view multi-level dictionary learning (CMDL) technique. An objective of dictionary learning techniques is to find some bases where images of the same object (e.g., person) can be encoded with similar feature representations across different views. However, existing dictionary learning techniques consider a feature representations in the original feature space and treats object images taken from different cameras or views equally in the training stage, which ignores variations between different cameras or views and the effects of view-specific interference, thereby leading to inferior performance. Furthermore, existing dictionary learning techniques learn a separate dictionary for each camera or view, which can lead to severe space (e.g., memory) constraints. Furthermore, the learned sparse codes for the same object from different cameras or views still exhibit high dissimilarity, thereby being disadvantegous for the task of similarity estimation and object matching, especially for the task of person re-ID.

Therefore, despite the current availability of many techniques for the task of object re-ID (e.g., person re-ID, in particular), these existing techniques do not provide accurate similarity estimation and object matching and some of the existing techniques need to be trained on large training datasets. Consequently, there still exists a need for object re-ID methods (e.g., for the task of person re-ID) that can at least increase inter-person discrimination, decrease intra-person diversity, take into account variations between different cameras or views, consider the effects of view-specific interference (e.g., during a training stage), be trained on modest or small training datasets, and perform accurately and within space (e.g., memory) constraints.

SUMMARY

According to a first aspect of the present disclosure, a method for object re-identification is provided. The method may include obtaining a first set of images from a first camera, and a second set of images from at least one second camera. The at least one second camera may be different from the first camera. The method may further include determining a first set of features based on the first set of images, the first set of features lying in a first feature space; and determining a second set of features based on the second set of images, the second set of features lying in a second feature space. The method may additionally include determining a first feature projection matrix and a second feature projection matrix that respectively map the first set of features and the second set of features to a shared feature space; and determining a common dictionary based on the shared feature space, where the first set of features mapped to the shared feature space and the second set of features mapped to the shared feature space are represented by entries of the common dictionary.

According to a second aspect of the present disclosure, a system for object re-identification is provided. The system includes a memory, and at least one processor communicatively coupled to the memory and configured to perform operations including: obtaining a first set of images from a first camera, and a second set of images from at least one second camera, where the at least one second camera is different from the first camera; determining a first set of features based on the first set of images, the first set of features lying in a first feature space; determining a second set of features based on the second set of images, the second set of features lying in a second feature space; determining a first feature projection matrix and a second feature projection matrix that respectively map the first set of features and the second set of features to a shared feature space; and determining a common dictionary based on the shared feature space, where the first set of features mapped to the shared feature space and the second set of features mapped to the shared feature space are represented by entries of the common dictionary.

According to a third aspect of the present disclosure a non-transitory computer-readable medium is provided. The non-transitory computer-readable medium comprising instructions that are operable, when executed by a data processing apparatus, to perform operations including: obtaining a first set of images from a first camera, and a second set of images from at least one second camera, where the at least one second camera is different from the first camera; determining a first set of features based on the first set of images, the first set of features lying in a first feature space; determining a second set of features based on the second set of images, the second set of features lying in a second feature space; determining a first feature projection matrix and a second feature projection matrix that respectively map the first set of features and the second set of features to a shared feature space; and determining a common dictionary based on the shared feature space, where the first set of features mapped to the shared feature space and the second set of features mapped to the shared feature space are represented by entries of the common dictionary.

DETAILED DESCRIPTION

Figure 1:
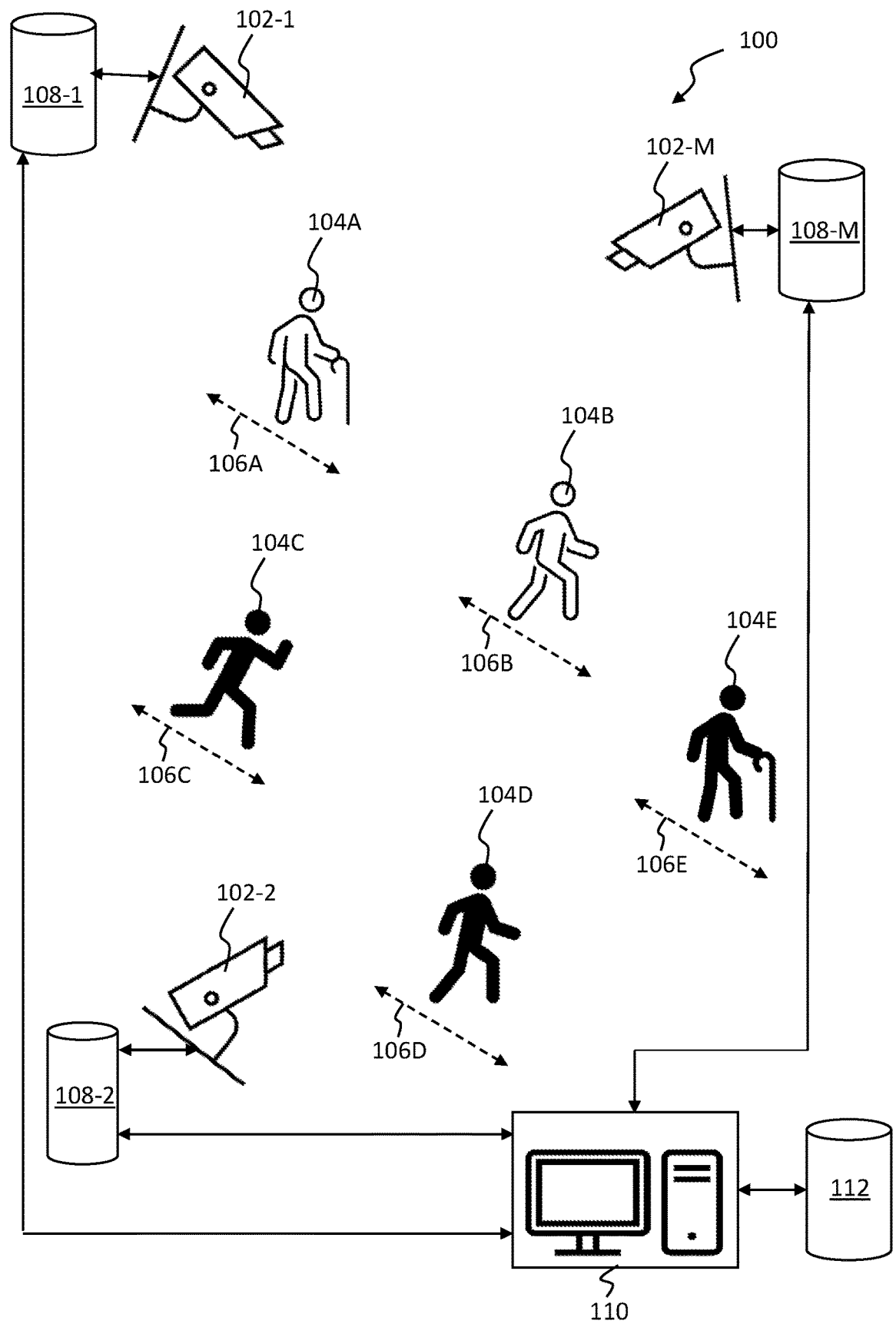
FIG. 1 is a diagram showing an example system having multiple cameras, according to an implementation of the present disclosure.

In some aspects of what is described here, a projection-based common dictionary learning (PCDL) technique that operates on images obtained from multiple cameras is proposed. The proposed PCDL technique can be used for the task of object re-ID, and various implementations of the PCDL technique are applied to the task of person re-ID. However, the proposed PCDL technique is not limited to the task of person re-ID and can be analogously applied to re-identify any object (e.g., any animate or inanimate object) based on images obtained from multiple cameras.

The proposed PCDL technique can be a feature learning technique that, in comparison to currently available techniques, obtains more robust and discriminative features, increases inter-person discrimination, decreases intra-person diversity, takes into account variations between different cameras or views, considers the effects of view-specific interference (e.g., during a training stage), and performs accurately and within space (e.g., memory) constraints.

In some aspects of what is described here, the proposed PCDL technique determines a view-specific feature projection matrix for each of the multiple cameras and maps original features of the images from the multiple cameras into a low-dimensional shared feature space. Within the shared feature space, the intra-person diversity (e.g., feature or appearance variations of the same person from different cameras or views) is reduced and the inter-person discrimination (e.g., feature or appearance differences for different persons from different cameras or views) is enlarged, thereby increasing the accuracy of person re-ID.

Furthermore, simultaneous to determining a view-specific feature projection matrix for each of the multiple cameras, the proposed PCDL technique determines a compact, common dictionary that represents the features in the shared feature space. For example, each of the features in the shared feature space can be represented by a spase linear combination of the entries of the dictionary (also referred to as dictionary atoms). The sparse linear combination for a feature can also be referred to as a sparse code for the feature. Since the common dictionary is determined using the shared feature space with low intra-person diversity and high inter-person discrimination, the sparse codes generated for features belonging to the same person should be more similar than the sparse codes generated for features belonging to different persons. Therefore, in the proposed PCDL technique, a similarity score between sparse codes associated with a probe camera and a gallery camera can be used for the task of person re-ID. The simultaneous determination of the feature projection matrices and the common dictionary for the shared feature space ensures that the common internal data structure of the different cameras is preserved, which can be represented by the sparse codes for the features within the shared feature space.

In some instances, aspects of the systems and techniques described here provide technical improvements and advantages over existing approaches. For example, the proposed PCDL technique increases inter-person discrimination, decrease intra-person diversity, takes into account variations between different cameras or views, considers the effects of view-specific interference (e.g., during a training stage), can be trained on modest or small training datasets, and can perform accurately and within space (e.g., memory) constraints. Furthermore, the execution time of the proposed PCDL technique allows the proposed PCDL technique to be used in the task of real-time (or near real-time) person re-ID.

FIG. 1 is a diagram showing an example system 100, according to an implementation of the present disclosure. The example system 100 includes multiple cameras 102-1, 102-2, 102-M, each of which is communicatively coupled (e.g., via a wired communications protocol, a wireless communications protocol, or a combination thereof) to respective first data storage devices 108-1, 108-2, 108-M. In various implementations, the number M can be any integer greater than or equal to two. The system 100 may also include a computing system 110 communicatively coupled (e.g., via a wired communications protocol, a wireless communications protocol, or a combination thereof) to a second data storage device 112. The first data storage devices 108-1, 108-2, 108-M may also be communicatively coupled (e.g., via a wired communications protocol, a wireless communications protocol, or a combination thereof) to the computing system 110. The data storage devices 108-1, 108-2, 108-M, 112 may be local data storage devices or distributed in a cloud or across different clouds. The multiple cameras 102-1, 102-2, 102-M may be deployed across different locations in an environment that may include persons 104A, 104B, 104C, 104D, 104E, each moving along respective, different trajectories 106A, 106B, 106C, 106D, 106E. The multiple cameras 102-1, 102-2, 102-M may obtain respective images or videos (or both) of the persons 104A, 104B, 104C, 104D, 104E, and the respective images or videos may be stored in the respective first data storage devices 108-1, 108-2, 108-M. Each of the cameras 102-1, 102-2, 102-M has a respective view and may be exposed to respective, different environmental conditions (e.g., illumination, occlusion, viewpoint, and background). The respective views of the cameras 102-1, 102-2, 102-M may also be non-overlapping views. In person re-ID, the images obtained from the multiple cameras 102-1, 102-2, 102-M are analyzed by the computing system 110 to determine whether a person (e.g., the person 104A) shown in one or more images obtained from one camera (e.g., the camera 102-1) is the same person shown in one or more images obtained from a different camera (e.g., the camera 102-2).

According to various implementations, the computing system 110 may execute the proposed PCDL technique of this disclosure. As an example, the computing system 110 may include memory and one or more processors coupled to the memory and configured to execute operations stipulated by the instructions. For example, the instructions may include instructions to perform one or more of the operations in the example processes 2100 and 2200 shown in FIGS. 21 and 22, respectively. The instructions executed by the one or more processors can include programs, codes, scripts, modules, or other types of data stored in a memory. Additionally or alternatively, the instructions can be encoded as pre-programmed or re-programmable logic circuits, logic gates, or other types of hardware or firmware components or modules. The processor may be or include a general-purpose microprocessor, as a specialized co-processor or another type of data processing apparatus. The computing system 110 may be a local computing system or distributed in a cloud or across different clouds. When the system 100 is in a training mode, a training dataset may be received by the computing system 110 from any of the data storage devices 108-1, 108-2, 108-M, 112 to train the proposed PCDL technique. Once the proposed PCDL technique has been trained, it may be used to identify the persons 104A, 104B, 104C, 104D, 104E using the images stored in the first data storage devices 108-1, 108-2, 108-M (e.g., processed in real time directly from the cameras). The example of FIG. 1 illustrates separate data storage devices 108-1, 108-2, 108-M that each store image or video data from the respective cameras 102-1, 102-2, 102-M. However, in other implementations of the system 100, the image or video data from the respective cameras 102-1, 102-2, 102-M may be stored in a single data storage device or a different number of data storage devices.

Figure 2:
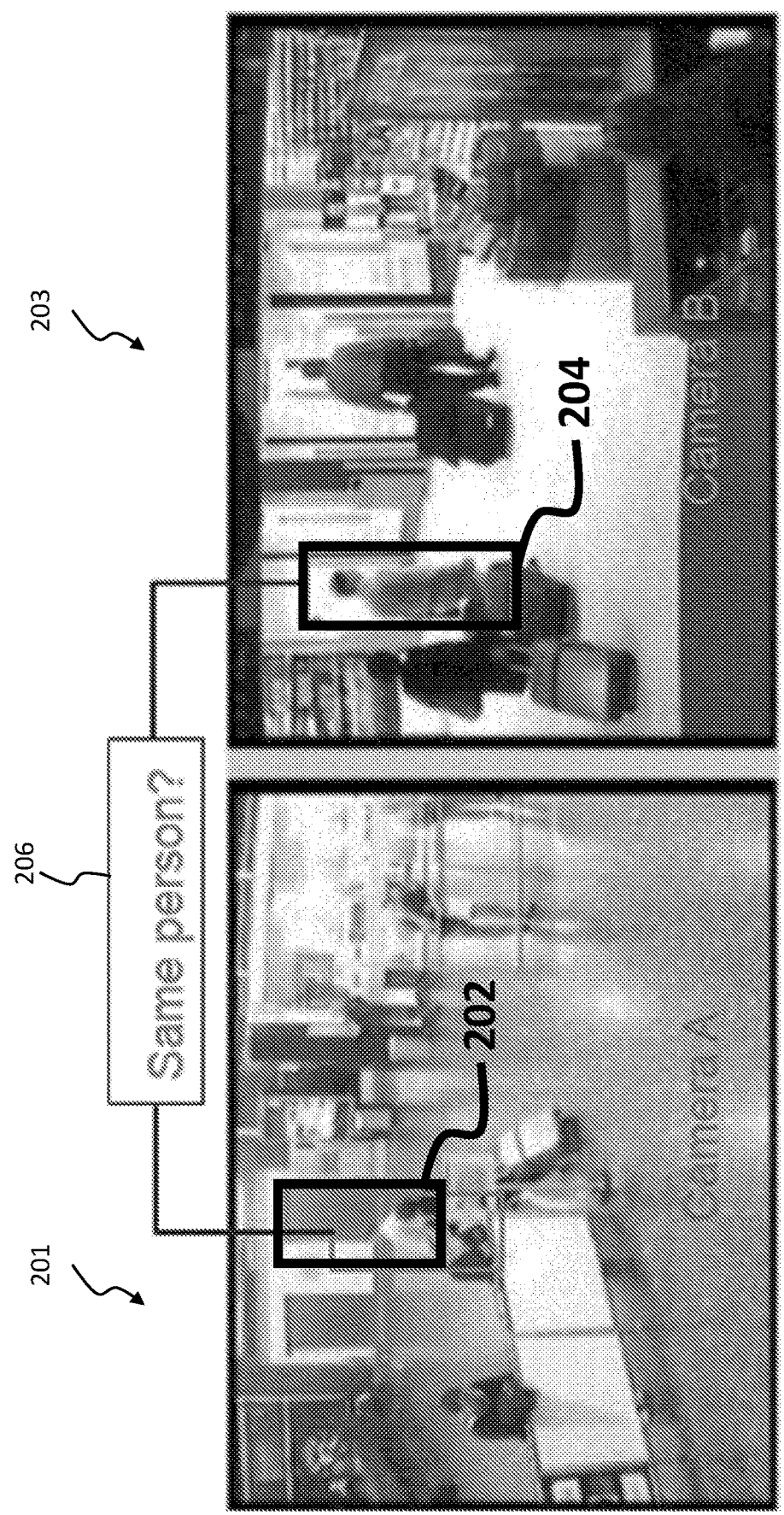
FIG. 2 shows example images obtained from respective cameras and illustrates the objective of person re-identification, according to an implementation of the present disclosure.

Person re-ID may be used for a variety of applications, non-limiting examples being suspect tracking in public safety, shopping pattern discovery in the retail sector, outpatient movement analysis in health care. The concept of person re-ID is further illustrated in the example of FIG. 2. FIG. 2 shows example images 201, 203 respectively obtained from different cameras and illustrates the objective of person re-identification, according to an implementation of the present disclosure. The task of person re-ID is to determine whether a person in an image from one camera is the same person in another image from another camera. For example, a first image 201 (which may be obtained by a first camera) shows a person 202 in a first view, and a second image 203 (which may be obtained by a second, different camera) shows a person 204 in a second view. The first and second views may be non-overlapping views. The objective of person re-ID (illustrated as reference numeral 206) is to determine whether the person 202 in the first image 201 and the person 204 in the second image 203 are the same person. Stated differently, the task of person re-ID is to find the same person's image in a different camera with a non-overlapping view.

Figure 3A:
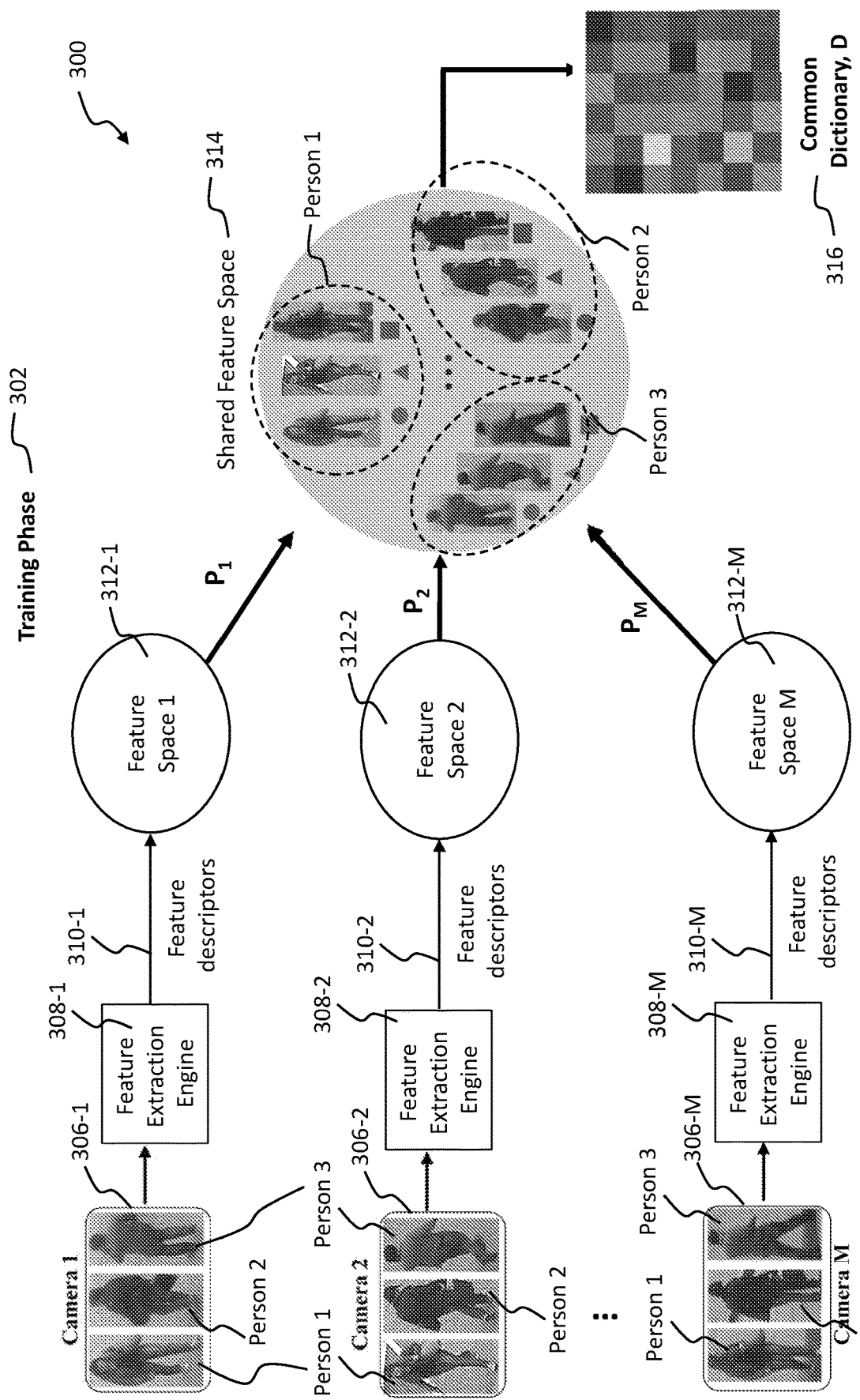
FIG. 3A shows a training phase of an example process of using a projection-based common dictionary learning (PCDL) technique from multiple cameras for person re-identification, according to an implementation of the present disclosure.
Figure 3B:
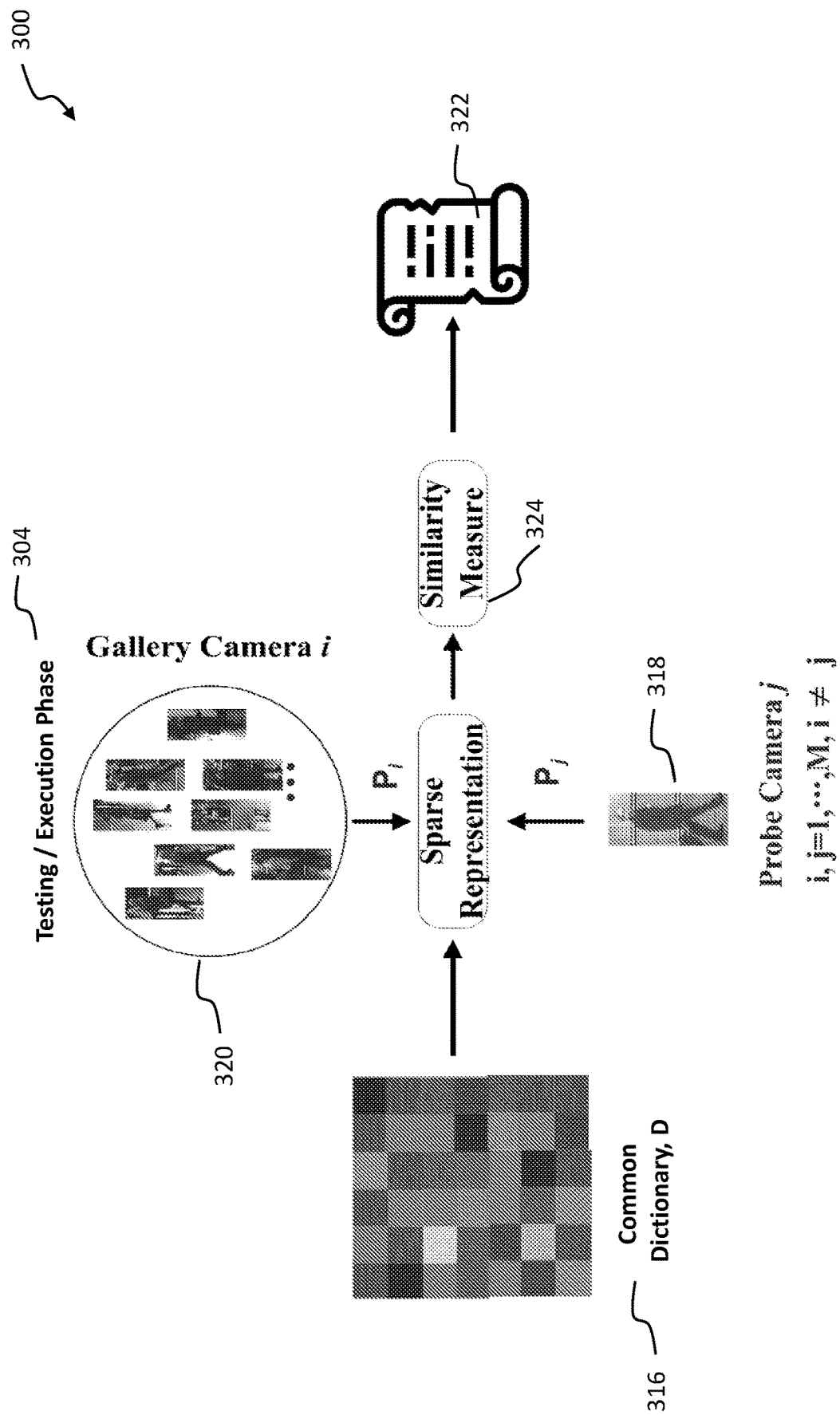
FIG. 3B shows a testing phase an example process of using the PCDL technique from multiple cameras for person re-identification, according to an implementation of the present disclosure.

FIGS. 3A and 3B shows an example process 300 of using projection-based common dictionary learning (PCDL) from multiple cameras for person re-identification, according to an implementation of the present disclosure. The process 300 includes a training phase 302 (shown in FIG. 3A) and a testing or execution phase 304 (shown in FIG. 3B). As seen in the example of FIG. 3A, in the training phase 302, each of the multiple cameras obtains a respective image set. For example, a first camera having a first view (e.g., camera 102-1 in FIG. 1) obtains a first image set 306-1, a second camera having a second, different view (e.g., camera 102-1 in FIG. 1) obtains a second image set 306-2, and so on until an $M^{th}$ camera having an $M^{th}$, different view (e.g., camera 102-M in FIG. 1) obtains an $M^{th}$ image set 306-M. Each image set 306 may include images of common persons. As an illustration, in the example shown in FIG. 3, the first image set 306-1 includes at least one image of a first person (denoted as "Person 1" in FIG. 3A), at least one image of a second person (denoted as "Person 2" in FIG. 3A), and at least one image of a third person (denoted as "Person 3" in FIG. 3A). Similarly, the second image set 306-2 includes at least one image of the Person 1, at least one image of the Person 2, and at least one image of the Person 3. In like manner, the $M^{th}$ image set 306-M includes at least one image of the Person 1, at least one image of the Person 2, and at least one image of the Person 3. However, since the first camera, the second camera, and the $M^{th}$ camera may have different views and may be exposed to different environmental conditions (e.g., illumination, occlusion, viewpoint, and background), the images of Person 1 across the multiple cameras may be vastly different. Similarly, the images of Person 2 across the multiple cameras may be vastly different, and the images of Person 3 across the multiple cameras may be vastly different.

In various aspects of the training phase 302 of process 300, the image sets 306-1, 306-2, 306-M are provided as inputs to feature extraction engines 308-1, 308-2, 308-M, respectively. The feature extraction engines 308-1, 308-2, 308-M may be implemented using one or more processors configured to execute instructions, for example, to generate feature descriptors 310-1, 310-2, 310-M based on the image sets 306-1, 306-2, 306-M, respectively. The feature descriptors 310-1, 310-2, 310-M may be referred to as a first set of features 310-1, a second set of features 310-2, and an $M^{th}$ set of features 310-M, respectively. In some implementations, the feature descriptors 310-1, 310-2, 310-M may be expressed as feature vectors that lie in respective, different feature spaces 312-1, 312-2, 312-M. In some implementations, the feature descriptors 310-1, 310-2, 310-M are generated by the feature extraction engines 308-1, 308-2, 308-M based on the content of the image sets 306-1, 306-2, 306-M, non-limiting examples being color, texture, shape, position, dominant edges of image items and regions. Example techniques that may be executed by the feature extraction engines 308-1, 308-2, 308-M include extracting one or more of the following features: color histograms, dense scale-invariant feature transform (SIFT) features, attributes, salient color features, mid-level feature maps, or polynomial kernel feature maps. In some examples, dense features can be extracted from local patches to obtain effective representation. The local patches may be extracted on a dense grid, and the size of each patch may be 10 pixels×10 pixels, with a grid step of 5 pixels. For each pixel, 32-dimensional color histogram features and 128-dimensional dense SIFT features can be extracted in each LAB channel. Furthermore, the color histograms can be calculated in different sampling scales with down-sampling factors 0.5 and 0.75. In some instances, the features of a patch can be normalized to unit length, and each patch may be represented by a 672-dimensional feature vector.

In the proposed PCDL technique, the feature descriptors 310-1, 310-2, 310-M that lie in respective, different feature spaces 312-1, 312-2, 312-M are mapped into a shared, low-dimensional feature space 314 such that the intra-person similarity across the multiple cameras is increased (and, in some instances, maximized) in the shared feature space 314; stated differently, in the shared feature space 314, intra-person diversity is reduced (and, in some instances, minimized). Furthermore, inter-person similarity across multiple cameras is decreased (and, in some instances, minimized) in the shared feature space 314; stated differently, in the shared feature space 314, inter-person discrimination is increased (and, in some instances, maximized). In some implementations, the training phase 302 of the process 300 determines feature projection matrices $P_1$, $P_2$, $P_M$ that respectively map the feature descriptors 310-1, 310-2, 310-M in the feature spaces 312-1, 312-2, 312-M to the shared, low-dimensional feature space 314. Consequently, in determining the feature projection matrices $P_1$, $P_2$, $P_M$, the process 300 assumes that there exists a shared space among the multiple camera views under which the same person, in different views, has the same intrinsic structural patterns or features. By exploring appropriate transform models (e.g., when determining the feature projection matrices $P_1$, $P_2$, $P_M$), the process 300 projects the features (e.g., visual features) of the persons acquired by multiple cameras onto the shared feature space 314, with the similarity of features from different persons being small.

In the training phase 302 of the process 300, a common dictionary 316 is also determined (e.g., simultaneously with the determination of feature projection matrices $P_1$, $P_2$, $P_M$) based on the shared feature space 314. In some instances, the common dictionary 316 is used to bridge the divergences and differences between the different camera views. Accordingly, the common dictionary 316 can be used to represent all the features that lie in the shared feature space 314 using respective sparse representations. For example, as discussed in further detail below, the common dictionary 316 can include multiple entries that are referred to as dictionary atoms. Using the common dictionary 316, each of the features in the shared feature space 314 can be represented by a spase linear combination of the dictionary atoms. The sparse representations may be used as sparse codes that include discriminative coding coefficients (e.g., coding coefficients that can be used to discriminate or distinguish one person from another and that can be used for the purpose of person re-ID). Since the common dictionary 316 is determined using the shared feature space 314 with low (e.g., minimum) intra-person diversity and high (e.g., maximum) inter-person discrimination, the sparse codes generated for features belonging to the same person can be more similar than the sparse codes generated for features belonging to different persons. As described in further detail below, a coding coefficient regularization term can be added to enforce a condition that if images captured from different camera views come from the same person, the sparse codes of the images/features are similar, and a condition that if images captured from different camera views come from different persons, the sparse codes of the images/features are dissimilar. In contrast to existing dictionary learning techniques that learn a separate dictionary for each camera or view, which can lead to severe space (e.g., memory) constraints, the proposed PCDL technique determines the common dictionary 316 for different camera views in the shared feature space 314. Therefore, if images that are obtained from different camera views come from the same person, the sparse codes learned with the common dictionary 316 can be more similar than the coding coefficients learned with the view-specific dictionaries of existing dictionary learning techniques. This leads to the ability of the proposed PCDL technique to utilize a similarity score between sparse codes for the task of person re-ID.

Referring to FIG. 3B, in the testing phase 304 of the process 300, which may also be referred to as an execution phase of the process 300, the objective may be to match a probe (or query) image 318 obtained from a probe camera (indicated in FIG. 3B as "Probe Camera j") against a set of gallery images 320 from a gallery camera (indicated in FIG. 3B as "Gallery Camera i") and to generate a ranked list 322 of gallery images according to their similarity measure 324, typically assuming the correct match is assigned to one of the top ranks, ideally Rank-1, although other ranks (e.g., Rank-5, Rank-10, Rank-20) may be used. In the proposed PCDL technique, a sparse code can be determined for the probe image 318 and for each of the images in the set of gallery images 320. The sparse code for the probe image 318 can be determined based on the feature projection matrix $P_j$ corresponding to the Probe Camera j and the common dictionary 316, both of which were determined in the training phase 302 of the process 300. Likewise, the sparse codes for the images in the set of gallery images 320 can be determined based on the feature projection matrix $P_i$ corresponding to the Gallery Camera i and the common dictionary 316, both of which were determined in the training phase 302 of the process 300. According to various implementations, the similarity measure 324 between the sparse code for the probe image 318 and the sparse code for each of the images in the set of gallery images 320 can be expressed as respective similarity scores, and the ranked list 322 can be based on the similarity scores.

Figure 4:
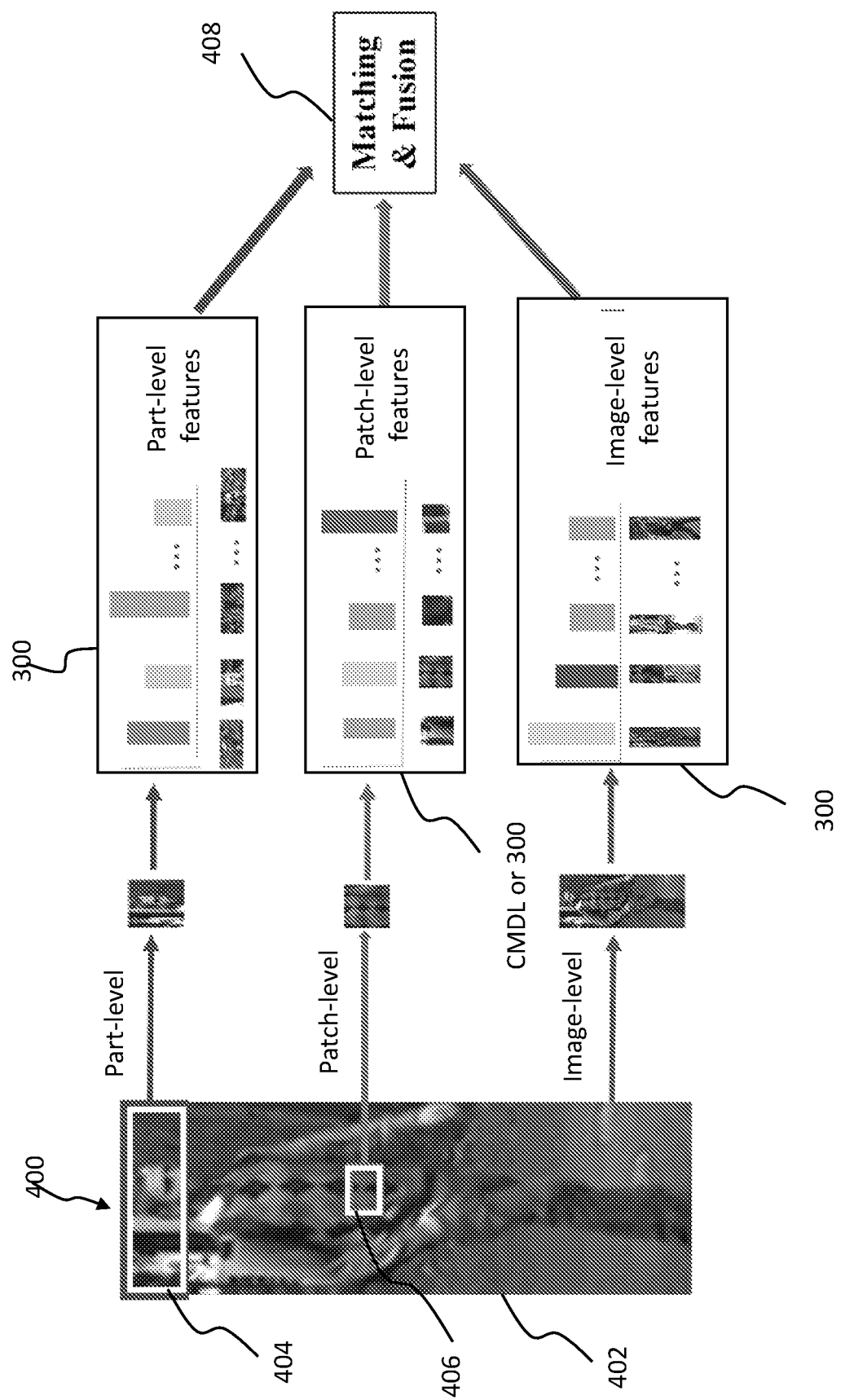
FIG. 4 shows an example multi-level representation of an image, including an image-level representation, a part-level representation, and a patch-level representation, according to an implementation of the present disclosure.

Discriminative information (e.g., information that can be used to discriminate or distinguish one person from another) can be embedded in multiple levels of feature representations, and each level provides a representation of a person's feature with a specific scale. Therefore, in various implementations, the process 300 can be executed on various levels of each of the image sets 306-1, 306-2, 306-M. FIG. 4 shows an example multi-level representation of an image 400, including an image-level representation 402, a part-level representation 404, and a patch-level representation 406, according to an implementation of the present disclosure. In general, the image-level representation 402 is associated with a high-level determination that corresponds to the overall image 400, while the part-level representation 404 can be associated with dividing the image 400 into multiple smaller horizonal overlapping parts. Furthermore, the patch-level representation 406 can be associated with dividing the image 400 into multiple smaller, overlapping subcomponents (e.g., patches), where the patches identified are smaller than the horizontal parts identified in the part-level representation 404. According to various aspects of the present disclosure, the process 300 is performed for all images at the image-level representation 402 to obtain one or more similarity scores associated with the image-level representation 402. The process 300 is also performed for all images at the part-level representation 404 to obtain one or more similarity scores associated with the part-level representation 404. According to various aspects of the present disclosure, either a cross-view multi-level dictionary learning (CMDL) technique or the process 300 may be performed for all images at the patch-level representation 406 to obtain one or more similarity scores associated with the patch-level representation 406. The similarity scores over the different levels of the image 400 can be subsequently fused (e.g., in matching and fusion operation 408) to obtain a final similarity score that can be used for the task of person re-ID.

For a better understanding of the present disclosure and for ease of reference, the present disclosure is separated into sections, and various concepts that are relevant to the various aspects of the present disclosure are now discussed.

General Formulation for Two Camera Views

This section assumes that the number of cameras in an environment is two (e.g., M=2 in the example of FIG. 1) and discusses the general approach of simultaneously determining the feature projection matrices $P_1$, $P_2$ and the common dictionary 316 in the training phase 302 of process 300.

Let $X_{(1)} \in R^{m \times n}$ and $X_{(2)} \in R^{m \times n}$ denote two image sets collected from two different views, respectively. An objective of the training phase 302 is to determine a shared K-atoms dictionary $D \in R^{d \times K}$ and mappings $P_{(1)} \in R^{d \times m}$ and $P_{(2)} \in R^{d \times m}$ onto the shared, low-dimensional feature space 314, which can minimize the representation error in the shared feature space 314. Formally, this can be expressed as minimizing the following cost function:

$$C_1(D, P_{(1)}, P_{(2)}, A_{(1)}, A_{(2)}) = \|P_{(1)}X_{(1)} - DA_{(1)}\|_F^2 + \|P_{(2)}X_{(2)} - DA_{(2)}\|_F^2 \quad (1)$$

where $A_{(1)}$ and $A_{(2)}$ are the sparse representations of $P_{(1)}X_{(1)}$ and $P_{(2)}X_{(2)}$ over D, respectively.

In general, it may be desirable if the projections $P_{(1)}$ and $P_{(2)}$, while bringing the data from two domains to the shared feature space 314, do not lose information available in the original domains. To facilitate this, a Principal Component Analysis (PCA)-like regularization term is added to preserve energy in the original signal. This PCA-like regularization term can be expressed as:

$$C_2(P_{(1)}, P_{(2)}) = \|X_{(1)} - P_{(1)}^T P_{(1)} X_{(1)}\|_F^2 + \|X_{(2)} - P_{(2)}^T P_{(2)} X_{(2)}\|_F^2 \quad (2)$$

It can be shown that the cost function $C_1$ and the regularization term $C_2$, after ignoring the constant terms in $X_{(1)}$ and $X_{(2)}$, can be written as:

$$C_1(D, \tilde{P}, \tilde{A}) = \|\tilde{P}\tilde{X} - D\tilde{A}\|_F^2 \quad (3)$$

$$C_2(\tilde{P}) = -tr((\tilde{P}\tilde{X})(\tilde{P}\tilde{X})^T) \quad (4)$$

where $\tilde{P} = [P_{(1)}, P_{(2)}]$, $$\tilde{X} = \begin{pmatrix} X_{(1)} & 0 \\ 0 & X_{(2)} \end{pmatrix},$$

and $\tilde{A} = [A_{(1)}, A_{(2)}]$.

Images from the same person captured by different views can be assumed to have similar sparse codes, while images from different persons captured by different views can be assumed to have dissimilar sparse codes. To enforce this condition, a coding regularization term $C_3$ can be defined as follows:

$$C_3(A_{(1)}, A_{(2)}) = \|A_{(1)} - A_{(2)}\|_F^2 + tr(A_{(1)}^T A_{(2)} S) \quad (5)$$

where S is defined as $$S_{ij} = \begin{cases} 0, & \text{if } i = j \\ 1/n, & \text{otherwise} \end{cases}.$$

Based on Equations (1) to (5), the following objective function can be defined:

$$\{D, P_{(1)}, P_{(2)}, A_{(1)}, A_{(2)}\} = \quad (6)$$

$$\arg\min_{\substack{D, P_{(1)}, P_{(2)}, \\ A_{(1)}, A_{(2)}}} C_1(D, P_{(1)}, P_{(2)}, A_{(1)}, A_{(2)}) + \lambda_1 C_2(P_{(1)}, P_{(2)}) + \lambda_2 C_3(A_{(1)}, A_{(2)})$$

Figure 5:
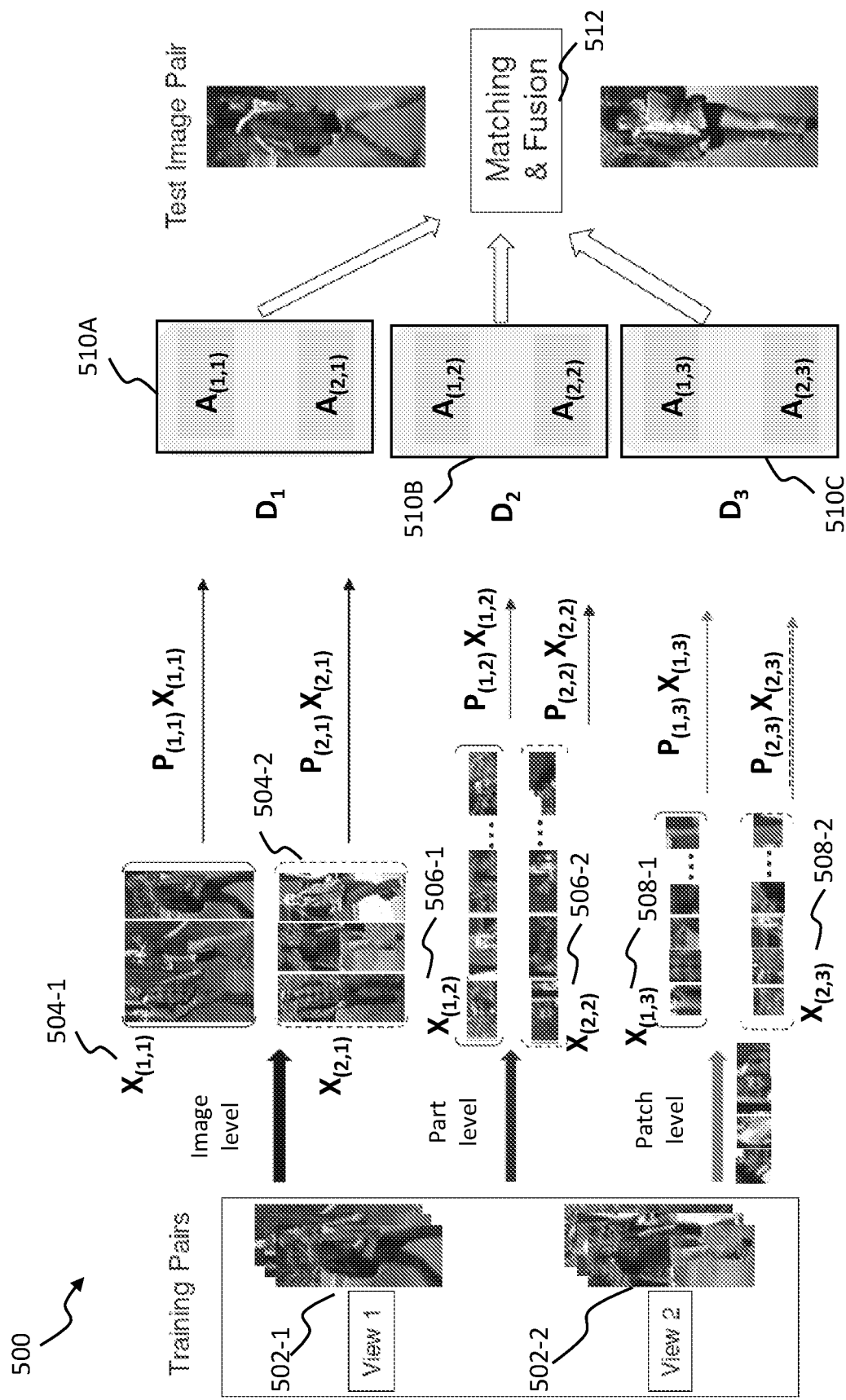
FIG. 5 shows an example framework for generating multiple levels of feature representations from multi-level representations of images, where each level is associated with a respective common dictionary, according to an implementation of the present disclosure.

As discussed above, discriminative information can be embedded in multiple levels of feature representations, and each level can provide a representation of a person's feature with a specific scale. Therefore, the general formulation shown in Equations (1) to (6) can be applied to generate multiple levels of feature representations. FIG. 5 shows an example framework 500 for generating multiple levels of feature representations from multi-level representations of images (e.g., as illustrated in FIG. 4), where each level is associated with a respective common dictionary $D_1$, $D_2$, $D_3$, according to an implementation of the present disclosure. As seen in FIG. 5, a first camera obtains a first image set 502-1 and a second camera obtains a second image set 502-2.

The images in the image set 502-1 can be used to generate image-level representations 504-1 (also denoted as image set $X_{(1,1)}$), part-level representations 506-1 (also denoted as image set $X_{(1,2)}$), and patch-level representations 508-1 (also denoted as image set $X_{(1,3)}$). Similarly, the images in the image set 502-2 can be used to generate image-level representations 504-2 (also denoted as image set $X_{(2,1)}$), part-level representations 506-2 (also denoted as image set $X_{(2,2)}$), and patch-level representations 508-2 (also denoted as image set $X_{(2,3)}$).

As seen in FIG. 5, in some implementations, the image-level representations 504-1, 504-2 can be used to determine feature projection matrices $P_{(1,1)}$ and $P_{(2,1)}$ as well as a common dictionary $D_1$ associated with the image-level representations 504-1, 504-2. Furthermore, the sparse representations $A_{(1,1)}$ and $A_{(2,1)}$ of $P_{(1,1)}X_{(1,1)}$ and $P_{(2,1)}X_{(2,1)}$ over the common dictionary $D_1$, respectively, are determined using the general formulation shown in Equations (1) to (6). As seen in FIG. 5, in some implementations, the part-level representations 506-1, 506-2 can be used to determine feature projection matrices $P_{(1,2)}$ and $P_{(2,2)}$ as well as a common dictionary $D_2$ associated with the image-level representations 506-1, 506-2. Furthermore, the sparse representations $A_{(1,2)}$ and $A_{(2,2)}$ of $P_{(1,2)}X_{(1,2)}$ and $P_{(2,2)}X_{(2,2)}$ over the common dictionary $D_2$, respectively, can be determined using the general formulation shown in Equations (1) to (6). As seen in FIG. 5, in some implementations, the patch-level representations 508-1, 508-2 can used to determine feature projection matrices $P_{(1,3)}$ and $P_{(2,3)}$ as well as a common dictionary $D_3$ associated with the image-level representations 508-1, 508-2. Furthermore, the sparse representations $A_{(1,3)}$ and $A_{(2,3)}$ of $P_{(1,3)}X_{(1,3)}$ and $P_{(2,3)}X_{(2,3)}$ over the common dictionary $D_3$, respectively, can determined using the general formulation shown in Equations (1) to (6). The view consistency constraints discussed with regards to Equations (1) to (6) are indicated in FIG. 5 as shared areas 510A, 510B, 510C. The results of the multi-level processing are combined (via the matching and fusing operation 512) to obtain a final similarity score that can be used for the task of person re-ID.

Detailed Formulation for Two Camera Views

This section assumes that the number of cameras in an environment is two (e.g., M=2 in the example of FIG. 1) and discusses general formulation presented in Equations (1) to (6) in greater mathematical detail. The detailed formulation provides an approach of simultaneously determining the feature projection matrices $P_1$, $P_2$ and the common dictionary 316 in the training phase 302 of process 300. This section also dicusses generating one or more similarity scores in the testing phase 304 of process 300, where a person re-ID result is obtained (e.g., where a determination is made as to whether a person shown in one image and a person shown in another image are the same person).

For the training phase 302 of process 300, let $X_{(1)}=[x_1^{(1)}, \ldots, x_n^{(1)}] \in R^{m \times n}$ and $X_{(2)}=[x_1^{(2)}, \ldots, x_n^{(2)}] \in R^{m \times n}$ be two image sets collected from two different cameras or views, where m is the feature dimension; $x_i^{(1)}$ is the i-th person from Camera 1, and $x_j^{(2)}$ is the j-th person from Camera 2. To determine more robust and discriminative representations from different training image sets, the proposed PCDL technique jointly learns view-specific projection matrices and a common dictionary to project each pair of images from different views into a shared space (e.g., the shared feature space 314). In the projected low dimensional space, each pair of images is encoded by discriminative coding coefficients. Formally, the learning framework can be formulated as:

$$\min_{P_{(1)},P_{(2)},D,A_{(1)},A_{(2)}} F_1(P_{(1)}, P_{(2)}, D, A_{(1)}, A_{(2)}) + \quad (7)$$
$$\lambda_1 F_2(P_{(1)}, P_{(2)}) + \lambda_2 F_3(A_{(1)}, A_{(2)}) + F_{reg}(A_{(1)}, A_{(2)})$$

where the reconstruction errors in two views are formulated as $$F_1(P_{(1)}, P_{(2)}, D, A_{(1)}, A_{(2)}) = \|P_{(1)}X_{(1)} - DA_{(1)}\|_F^2 + \|P_{(2)}X_{(2)} - DA_{(2)}\|_F^2 \quad (8)$$

Here, $D \in R^{d \times K}$ is the shared common dictionary, $d(:, k)$ is the k-th dictionary atom in D. The expressions $P_{(1)} \in R^{d \times m}$ and $P_{(2)} \in R^{d \times m}$ are projections for the image set obtained from the first camera and for the image set obtained from the second camera, respectively. The expressions $A_{(1)}=[\alpha_1^{(1)}, \alpha_2^{(1)}, \ldots, \alpha_n^{(1)}]$ and $A_{(2)}=[\alpha_1^{(2)}, \alpha_2^{(2)}, \ldots, \alpha_n^{(2)}]$ are sparse codes with respect to $P_{(1)}X_{(1)}$ and $P_{(2)}X_{(2)}$. The expressions $\lambda_1$, $\lambda_2$ and $\eta$ are trade-off parameters.

The feature projection matrices $P_{(1)}$ and $P_{(2)}$, which bring the data from different camera views to a shared feature space (e.g., the shared feature space 314) may not discard useful discriminative information otherwise available in the original feature space. Therefore, the second term $F_2(P_{(1)}, P_{(2)})$ in Equation (7) can be formulated as:

$$F_2(P_{(1)}, P_{(2)}) = \|X_{(1)} - P_{(1)}^T P_{(1)} X_{(1)}\|_F^2 + \|X_{(2)} - P_{(2)}^T P_{(2)} X_{(2)}\|_F^2 \quad (9)$$
$$\text{s.t. } P_{(i)} P_{(i)}^T = I, \forall i = 1, 2,$$

The regularization function $F_3(A_{(1)}, A_{(2)})$ in Equation (7) builds the view consistency between two views. Furthermore, it can be assumed that images of a same person under two different cameras have similar sparse codes, and images of different persons have dissimilar codes. Therefore, the regularization function can be defined as follows:

$$F_3(A_{(1)}, A_{(2)}) = \sum_{i,j}^n S_{ij}(\alpha_i^{(1)} - \alpha_j^{(2)})^2 \quad (10)$$
$$= tr(A_{(1)} L A_{(2)}^T)$$

where S is the affinity matrix and can be defined as $$S_{ij} \begin{cases} 1, & \text{if } l(x_i^{(1)}) = l(x_i^{(2)}) \\ \frac{1}{n} & \text{if } l(x_i^{(1)}) \neq l(x_i^{(2)}) \end{cases} \quad (11)$$

An expression L=B−S can be denoted as the Laplacian matrix, where B=diag($b_1, \ldots, b_n$) is a diagonal matrix. The entries $b_i = \Sigma_j S_{ij}$, $l(x_i^{(1)})$ is the label of i-th person in Camera 1, and $l(x_i^{(2)})$ is the label of j-th person in Camera 2. The third term $F_3(A_{(1)}, A_{(2)})$ shown in Equation (7) can decrease the intra-person diversity and increase the inter-person discrimination when optimizing the objective function.

The fourth term shown in Equation (7) is a parameter regularization term, which can be defined as follows:

$$F_{reg}(A_{(1)}, A_{(2)}) = \eta(\mu \|A_{(1)}\|_F^2 + \|A_{(2)}\|_F^2) \quad (12)$$

Consequently, the objective function can be formulated as the following:

$$\min_{P_{(1)},P_{(2)},D,A_{(1)},A_{(2)}} \|P_{(1)}X_{(1)} - DA_{(1)}\|_F^2 + \|P_{(2)}X_{(2)} - DA_{(2)}\|_F^2 + \quad (13)$$
$$\lambda_1 (\|X_{(1)} - P_{(1)}^T P_{(1)} X_{(1)}\|_F^2 + \|X_{(2)} - P_{(2)}^T P_{(2)} X_{(2)}\|_F^2) +$$
$$\lambda_2 tr(A_{(1)} L A_{(2)}^T) + \eta(\|A_{(1)}\|_F^2 + \|A_{(2)}\|_F^2)$$
$$\text{s.t. } P_{(i)} P_{(i)}^T = I, \forall i = 1, 2, \|d(:, k)\| \leq 1, k = 1 \ldots, K.$$

As seen in Equation (13), the objective function has five matrix variables $P_{(1)}$, $P_{(2)}$, D, $A_{(1)}$ and $A_{(2)}$, which need to be optimized. To solve the objective function in Equation (13), the desired variables can be updated alternately using the following Operations (1), (2), (3).

Operation (1): In this operation, variables $P_{(1)}$ and $P_{(2)}$ are updated (e.g., optimized) with other variables fixed or held constant. Specifically, for the optimization of variables $P_{(1)}$ and $P_{(2)}$, Equation (13) can be simplified as follows:

$$\min_{P_{(1)},P_{(2)}} J(P_{(1)}, P_{(2)}) = \|P_{(1)}X_{(1)} - DA_{(1)}\|_F^2 + \|P_{(2)}X_{(2)} - DA_{(2)}\|_F^2 + \quad (14)$$

$$\lambda_1 \left( \|X_{(1)} - P_{(1)}^T P_{(1)} X_{(1)}\|_F^2 + \|X_{(2)} - P_{(2)}^T P_{(2)} X_{(2)}\|_F^2 \right)$$

$$\text{s.t. } P_{(i)} P_{(i)}^T = I, \forall i = 1, 2,$$

Ignoring the constant terms in $X_{(1)}$ and $X_{(2)}$, Equation (14) can be rewritten as follows:

$$\min_{\tilde{P}} J(\tilde{P}) = \|\tilde{P}\tilde{X} - D\tilde{A}\|_F^2 - tr\left((\tilde{P}\tilde{X})(\tilde{P}\tilde{X})^T\right) \quad (15)$$

$$\text{s.t. } P_{(i)} P_{(i)}^T = I, \forall i = 1, 2,$$

where $\tilde{P} = [P_{(1)}, P_{(2)}]$, $$\tilde{X} = \begin{pmatrix} X_{(1)} & 0 \\ 0 & X_{(2)} \end{pmatrix},$$

and $\tilde{A} = [A_{(1)}, A_{(2)}]$.

Due the orthonormality constraints on $P_{(i)}$, the optimization expressed in Equation (15) is not a convex problem. Therefore, Equation (15) can be solved using the manifold optimization technique.

Operation (2): In this operation, variables $A_{(1)}$ and $A_{(2)}$ are updated (e.g., optimized) with other variables fixed or held constant. Specifically, for the optimization of variables $A_{(1)}$ and $A_{(2)}$, Equation (13) can be simplified as follows:

$$\min_{A_{(1)}} J(A_{(1)}) = \|P_{(1)}X_{(1)} - DA_{(1)}\|_F^2 + \lambda_2 tr\left(A_{(1)} L A_{(2)}^T\right) + \eta \|A_{(1)}\|_F^2 \quad (16)$$

Setting $$\frac{\partial J(A_{(1)})}{\partial A_{(1)}} = 0,$$

the following solution is obtained:

$$A_{(1)} = (D^T D + (\lambda_2 + \eta)I)^{-1} (D^T P_{(1)} X_{(1)} - \lambda_2 A_{(2)} L), \quad (17)$$

where I is an identify matrix, and the solution of $A_{(2)}$ can be expressed as:

$$A_{(2)} = (D^T D + (\lambda_2 + \eta)I)^{-1} (D^T P_{(2)} X_{(2)} - \zeta_2 A_{(1)} L) \quad (18)$$

Operation (3): In this operation, variable D is updated (e.g., optimized) with other variables fixed or held constant. Specifically, for the optimization of variable D, Equation (13) can be simplified as follows:

$$\min_D J(D) = \|P_{(1)}X_{(1)} - DA_{(1)}\|_F^2 + \|P_{(2)}X_{(2)} - DA_{(2)}\|_F^2 = \|\tilde{P}\tilde{X} - D\tilde{A}\|_F^2 \quad (19)$$

$$\text{s.t. } \|d(:,k)\| \leq 1, k = 1, \ldots, K$$

Equation (19) can be solved using the Alternating Direction Method of Multipliers (ADMM) technique.

In various implementations of the proposed PCDL technique, operations (1), (2), and (3) are repeated until convergence is achieved. The concepts discussed above in relation to Equations (7) to (19) can be summarized in the following table:

TABLE 1

PCDL Technique for Two Cameras Views.
PCDL Technique for Two Cameras (Training Phase)

Input: Training images $X_{(1)}$, $X_{(2)}$ from two views, parameters $\lambda_1$, $\lambda_2$, $\eta$.
Output: Projections $P_{(1)}$ and $P_{(2)}$, dictionary D.
Initial: Initialize $\tilde{P}$ such that $P_{(i)} P_{(i)}^T = I$.
Repeat
1. Update $P_{(1)}$ and $P_{(2)}$ with other variables fixed or held constant via Eq. (15)
2. Update $A_{(1)}$ and $A_{(2)}$ with other variables fixed or held constant via Eq. (17) and Eq. (18).
3. Update D with other variables fixed or held constant via Eq. (19)
Until convergence Person Matching: In the testing phase 304 of process 300, a determination is made as to whether a person shown in one image and a person shown in another image are the same person based on a similarity score. For example, given an inquiry image $y_{(1)}$ from one camera and a gallery image $y_{(2)}$ from another different camera, using the learned view-specific projection matrices $P_{(1)}$ and $P_{(2)}$ and common dictionary D, the corresponding representation coefficients $\alpha_{(1)}$ and $\alpha_{(2)}$ over dictionary D can be computed as follows:

$$\hat{\alpha}_{(1)} = \arg\min_{\alpha_{(1)}} \|P_{(1)}y_{(1)} - D\alpha_{(1)}\|_2^2 + \lambda \|\alpha_{(1)}\|_2^2 \quad (20)$$

$$\hat{\alpha}_{(2)} = \arg\min_{\alpha_{(2)}} \|P_{(2)}y_{(2)} - D\alpha_{(2)}\|_2^2 + \lambda \|\alpha_{(2)}\|_2^2 \quad (21)$$

With the learned representations $\alpha_{(1)}$ and $\alpha_{(2)}$ (e.g., the sparse codes associated with inquiry image $y_{(1)}$ and gallery image $y_{(2)}$, respectively), the similarity score between these two images can be measured using the Cosine similarity function. As an example, the Cosine similarity function may be a measure of similarity between two non-zero vectors of an inner product space. In some implementations, the Cosine similarity of representations $\alpha_{(1)}$ and $\alpha_{(2)}$ may be equal the cosine of the angle between representations $\alpha_{(1)}$ and $\alpha_{(2)}$, which may also be the same as the inner product of the representations $\alpha_{(1)}$ and $\alpha_{(2)}$ normalized to both have length 1.

As discussed above in relation to FIGS. 4 and 5, the proposed PCDL technique can be used for various levels of feature representation, since discriminative information can be embedded in multiple levels of feature representations. Consequently, the proposed PCDL technique is performed at multiple levels, such as image-level representations and part-level representations. For example, each image is represented using a high-dimensional vector for the image-level representation. For the part-level representation, an image can be horizontally divided into a number of parts and vectorized. The objective function and optimization procedure discussed above in relation to Equations (7) to (19), as well as the calculation of similarity scores discussed above in relation to Equations (20) and (21), can be applied to the image-level representation and the part-level representation individually (e.g., as shown in FIG. 4). With regards to the patch-level representation, since each image is typically divided into hundreds of overlapping patches, applying the objective function and optimization procedure and caclulating similarity scores for each of these small patches can be extremely time-consuming. Therefore, in some aspects of the proposed PCDL technique, in the interest of computational efficiency, the CMDL technique is performed on all images at the patch-level representation. The similarity scores at each level are combined or fused to provide a single score as follows:

$$\text{Score }(i) = \text{Score}_{patch}(i) + \gamma_1 \text{Score}_{image}(i) + \gamma_2 \text{Score}_{part}(i) \quad (22)$$

where $\text{Score}_{image}(i)$, $\text{Score}_{part}(i)$ and $\text{Score}_{patch}(i)$ represent the similarity scores for image-levels, part-levels, and patch levels, respectively, and where $\gamma_1$ and $\gamma_2$ are trade-off parameters. In some implementations, the trade-off parameters $\gamma_1$ and $\gamma_2$ are in the range of [0, 4] (e.g., in a range [0, 3]).

Formulation for Multiple Camera Views

This section expands and generalizes the detailed formulation for two camera views and assumes that the number of cameras in an environment is any integer greater than or equal to two (e.g., M≥2). Specifically, given M image sets $\{X_{(i)}\}_{i=1}^{M}$ collected from M different cameras, the common dictionary and projection matrices can be jointly optimized as follows:

$$\min_{P_{(i)},D,A_{(i)}} \sum_{i=1}^{M} \|P_{(i)}X_{(i)} - DA_{(i)}\|_F^2 + \quad (23)$$

$$\lambda_1 \sum_{i=1}^{M} \|X_{(i)} - P_{(i)}^T P_{(i)} X_{(i)}\|_F^2 + \lambda_2 \sum_{i,j,i<j}^{M} tr(A_{(i)} L A_{(j)}^T) + \eta \sum_{i=1}^{M} \|A_{(i)}\|_F^2$$

$$\text{s.t. } P_{(i)} P_{(i)}^T = I, i = 1, \ldots, M, \|d(:,k)\| \leq 1, k = 1, \ldots, K.$$

where $P_{(i)}$ indicates the projection matrix associate with view i, i=1, ..., M, $A_{(i)}$ as the sparse coding matrix with respect to $P_{(i)}X_{(i)}$. Equation (23) can be solved by adopting the same operations discussed above in relation to Equations (7) to (21).

Experiments

Various experiments were conducted to demonstrate the efficacy, accuracy, and advantage of the proposed PCDL technique. In particular, five standard datasets, each having two camera views, were used. The standard datasets include the VIPeR dataset, the CUHK01 Campus dataset, the GRID dataset, the iLIDS dataset, and the PRID 450 dataset. A multi-view dataset (the WARD dataset) was also used to demonstrate the efficacy, accuracy, and advantage of the proposed PCDL technique.

The performance of the proposed PCDL technique can be compared to currently available person re-ID techniques to demonstrate the proposed PCDL technique's efficacy, accuracy, and advantage. Cumulative match characteristic (CMC) curves were used to measure the performances of the various techniques because it is equivalent to a 1:1 identification problem.

Currently available person re-ID techniques used in the experiments include currently available deep learning-based techniques, such as Camera coRrelation Aware Feature augmenTation (CRAFT). Other currently available person re-ID techniques include the following:

feature learning techniques (e.g., the Symmetry-Driven Accumulation of Local Features (SDALF) technique, the Salience Matching (eSalMatch) technique, the Weighted Linear Combination (WLC) technique, and High-level representation Guided Denoiser (HGD) technique);

metric learning techniques (e.g., the Pairwise Constrained Component Analysis (PCCA) technique, the Probabilistic Relative Distance Comparison (PRDC), the LMNN technique, the ITML technique, the KISSME technique, the XQDA technique, the MLAPG technique, the Kernel Local Fisher Discriminant Analysis (kLFDA) technique, the local Fischer (LF) technique, and the Similarity Learning with Spatial Constraints (SCSP) technique); and dictionary learning techniques (e.g., the CMDL technique, the Cross-view Projective Dictionary Learning (CPDL) technique, and the Semi-Supervised Coupled Dictionary Learning (SSCDL) technique).

In the experiments, salience features can be extracted on local patches, with each patch being set as 10×10 pixels that can be represented as a 672-dimension feature vector by extracting color histogram and dense SIFT features in each channel. For image-level feature extraction, patches belonging to the same image can be concatenated into a feature vector for training. Furthermore, for part-level feature extraction, patches belonging to a horizontal region of an image can be concatenated into a vector for training.

As discussed above, the proposed PCDL technique includes several parameters for the image-level representations and the part-level representations, such as $\lambda_1^{image}$, $\lambda_2^{image}$, $\eta_{image}$, $\lambda_1^{part}$, $\lambda_2^{part}$, $\eta_{part}$, $\gamma_1$, and $\gamma_2$. The effects of these parameters on the performance of the proposed PCDL technique are discussed in further detail below. However, for the purposes of this section on the experiments demonstrating the efficacy, accuracy, and advantage of the proposed PCDL technique, these parameters can be set empirically to obtain the highest performance. Parameters $\lambda_1^{image}$ and $\lambda_2^{image}$ can control the power of view-specific projection learning terms in different levels. If these parameters $\lambda_1^{image}$ and $\lambda_2^{image}$ are too small, the projection matrices may not be able to preserve the information available in the original space well. On the other hand, if these parameters $\lambda_1^{image}$ and $\lambda_2^{image}$ are too large, other terms of the proposed PCDL technique may be neglected. Therefore, the parameters $\lambda_1^{image}$ and $\lambda_2^{image}$ can be adjusted in the range of [0.0001, 5], and $\lambda_1^{image}=\lambda_1^{part}=0.5$ for all datasets in the experiments. Parameters $\lambda_2^{image}$ and $\lambda_1^{part}$ can control the effect of view consistency in different levels, and can be set to be in the range of [0.0001, 5]. In the experiments, $\lambda_2^{image}=0.005$, $\lambda_2^{part}=0.01$ for all datasets. Parameters $\eta_{image}$ and $\eta_{part}$ are regularization parameters. In the experiments, $\eta_{image}=0.001$ for image-level representation, and $\eta_{part}=0.0005$ for part-level representation. In addition, $\gamma_1$ and $\gamma_2$ are parameters for the fusion strategy and can be in the range of [0, 4] (e.g., the range [0, 3]). In the experiments, $\gamma_1=2.8$ and $\gamma_2=1.2$ for all datasets. For the patch-level representations, the parameter settings in the CMDL technique used in S. Li, M. Shao, and Y. Fu, "Person re-identification by cross-view multilevel dictionary learning," IEEE Trans. Pattern Anal. Mach. Intell., vol. 40, no. 12, 2018, pp. 2963-2977, can be used.

Figure 6:
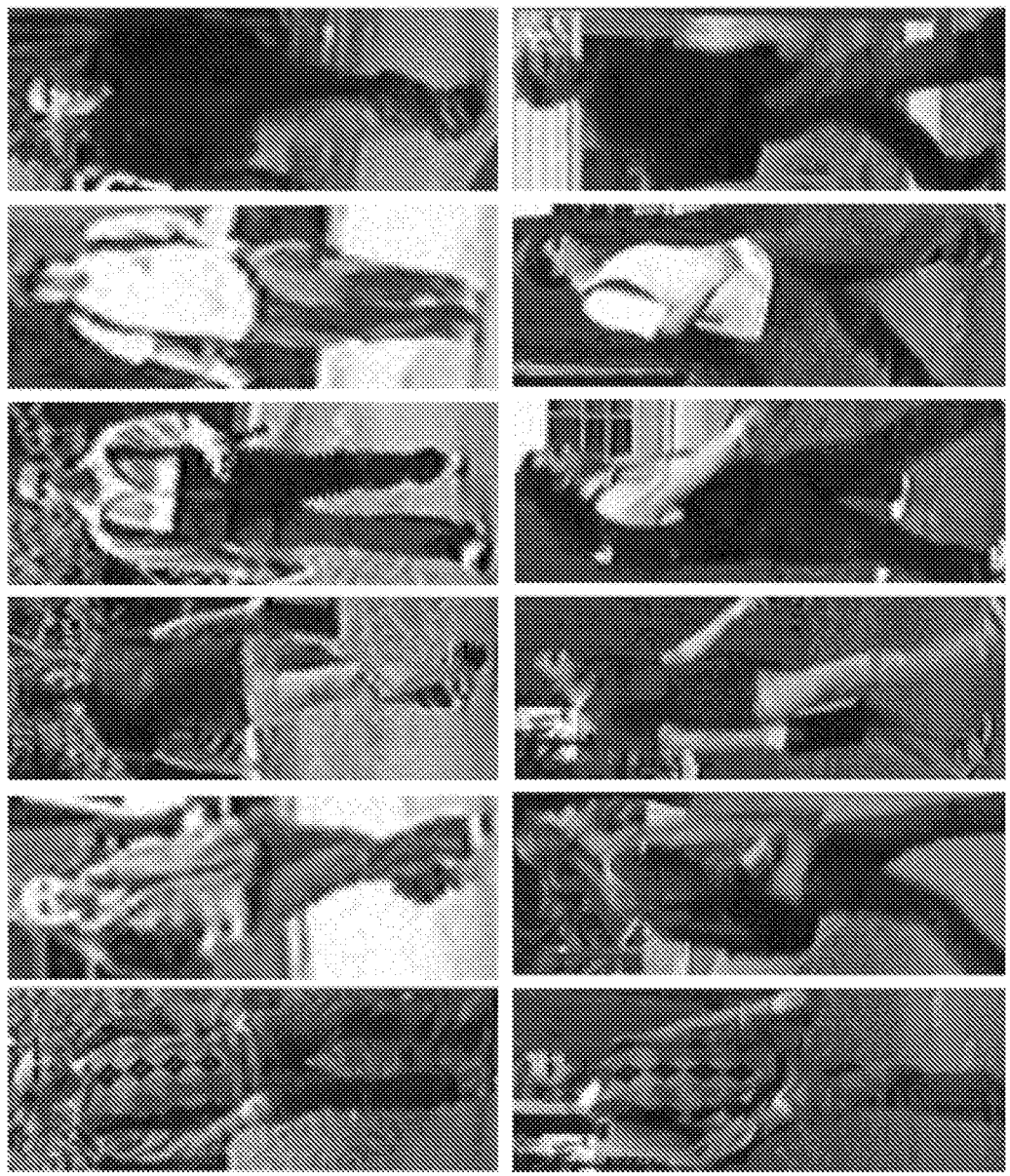
FIG. 6 shows example images from the VIPeR dataset, with the top row showing some images obtained by a first camera, and the bottom row showing some images obtained by a second camera.

VIPeR dataset: FIG. 6 shows example images from the VIPeR dataset, with the top row 602 showing some images obtained by a first camera, and the bottom row 604 showing some images obtained by a second camera. The VIPer dataset captures pedestrian images from two disjointed or non-overlapping views in an outdoor academic environment, which includes 632 pedestrian image pairs. The size of each image is 128×48 pixels. These images have significant condition changes in illumination, pose, and view point in the two different camera views, as seen in the example images shown in FIG. 6. In the experiments using the VIPeR dataset, half of the image pairs can be used for the training phase 302 of the process 300, and the other half can be used for the testing phase 304 of the process 300. Ten random trials can be repeated to get the average matching rates in the experiments.

Figure 7:
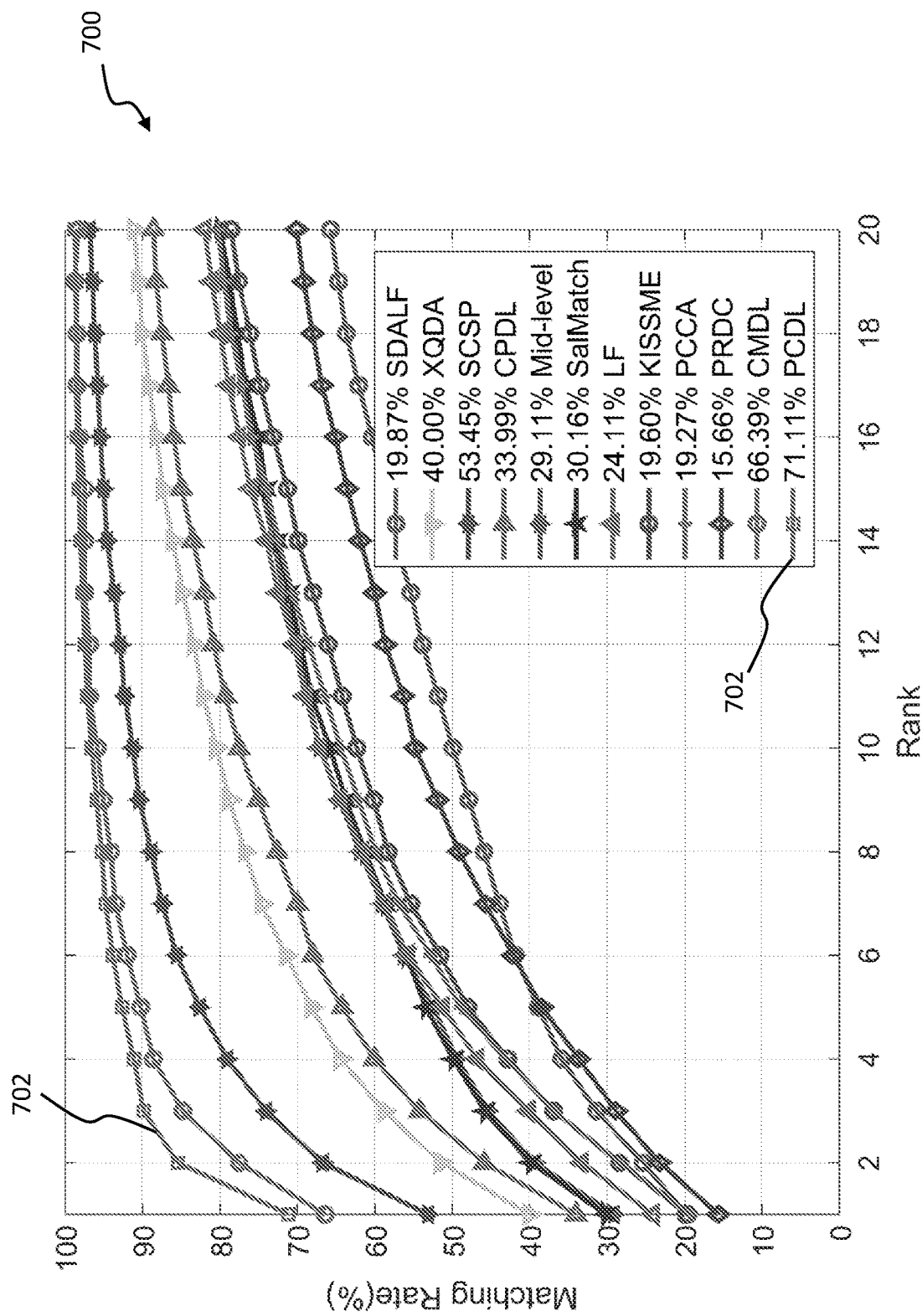
FIG. 7 shows a graph illustrating cumulative match characteristic curves for the proposed PCDL technique compared to other currently available techniques operating on the VIPeR dataset, according to an implementation of the present disclosure.

FIG. 7 shows a graph 700 illustrating CMC curves for the proposed PCDL technique compared to other currently available techniques operating on the VIPeR dataset, according to an implementation of the present disclosure. The horizontal axis of the graph 700 illustrates rank, and the vertical axis of the graph 700 illustrates matching rate in percentage. As seen in FIG. 7, the performance of the proposed PCDL technique (illustrated by curve 702) is better than all compared techniques over all ranks. For the experiments using the VIPeR dataset, Table 2 shows the average matching rates for all compared techniques on Ranks 1, 5, 10, and 20.

TABLE 2

Top r matching rates (%) on VIPeR dataset.

| Methods | r = 1 | r = 5 | r = 10 | r = 20 |
| --- | --- | --- | --- | --- |
| PCCA | 19.27 | 48.89 | 64.91 | 80.28 |
| PRDC | 15.66 | 38.42 | 53.86 | 70.09 |
| MLAPG | 40.73 | — | 82.34 | 92.37 |
| SCSP | 53.54 | 82.59 | 91.49 | 96.65 |
| KISSME | 39.2 | 71.8 | 81.3 | 92.4 |
| XQDA | 40.00 | — | 80.51 | 91.08 |
| WLC | 51.4 | 76.4 | 84.8 | — |
| eSalMatch | 44.56 | 72.1 | 83.5 | — |
| Mirror-KMFA | 42.97 | 75.82 | 87.28 | 94.84 |
| SSCDL | 25.60 | 53.70 | 68.10 | 83.60 |
| CPDL | 33.99 | 64.21 | 77.53 | 88.58 |
| HGDs | 54.7 | 83.4 | 90.9 | 95.7 |
| CMDL | 66.39 | 90.25 | 95.85 | 98.29 |
| CRAFT | 54.2 | 82.4 | 91.5 | 96.9 |
| CVPR-2018 | 51.9 | 74.4 | 84.8 | 90.2 |
| PCDL | 71.11 | 92.66 | 96.58 | 98.8 |

As seen in Table 2, the performance of the proposed PCDL technique is better than all compared techniques. Specifically, the proposed PCDL technique achieves 4.72% and 2.41% improvements over CMDL on Rank 1 and Rank 5. This indicates that mapping features from different views into a shared subspace and learning a common dictionary is more effective than learning dictionary pair in the original feature space. Furthermore, the proposed PCDL technique significantly outperforms deep learning approaches (e.g., CRAFT and CVPR-2018). The proposed PCDL technique achieves 16.9% and 10.26% improvements over CRAFT on Rank 1 and Rank 5, and achieves 19.2% and 18.26% improvements over CVPR-2018 on Rank 1 and Rank 5. The main reason is that insufficient training data in the VIPeR dataset limits these deep learning models. In other words, the proposed PCDL technique provides efficient, accurate, and superior performance even with small scale datasets.

To further verify the superiority of proposed PCDL technique over the dictionary pair learning in the original feature space, the proposed PCDL technique can be compared with CMDL on different level representations. For image-level representations, these models are denoted as PCDL_image and CMDL_image, respectively. For part-level representations, these models are denoted as PCDL_part and CMDL_part, respectively. For patch-level representation, the results obtained from CMDL_patch are directly fused. For fair comparison, the same features are used for both CMDL and the proposed PCDL technique. Table 3 shows the comparison results.

TABLE 3

Top r matching rates (%) of different level representations on VIPeR dataset.

| Methods | r = 1 | r = 5 | r = 10 | r = 20 |
| --- | --- | --- | --- | --- |
| CMDL_image | 21.82 | 55.06 | 70.63 | 84.98 |
| PCDL_image | 26.28 | 58.42 | 73.87 | 86.78 |
| CMDL_part | 15.58 | 46.32 | 62.58 | 77.20 |
| PCDL_part | 17.41 | 49.37 | 65.51 | 78.80 |
| CMDL_patch | 20.27 | 42.54 | 54.91 | 69.61 |

As seen in Table 3, the PCDL_image and PCDL_part obtain better performance on all Ranks than CMDL_image and CMDL_part, and archive 4.46% and 1.83% improvements over CMDL_image and CMDL_part on Rank 1, respectively. This indicates that learning view-specific feature projection matrices and common dictionary is beneficial (and advangeous over the CMDL technique) for the task of person re-ID.

Figure 8A:
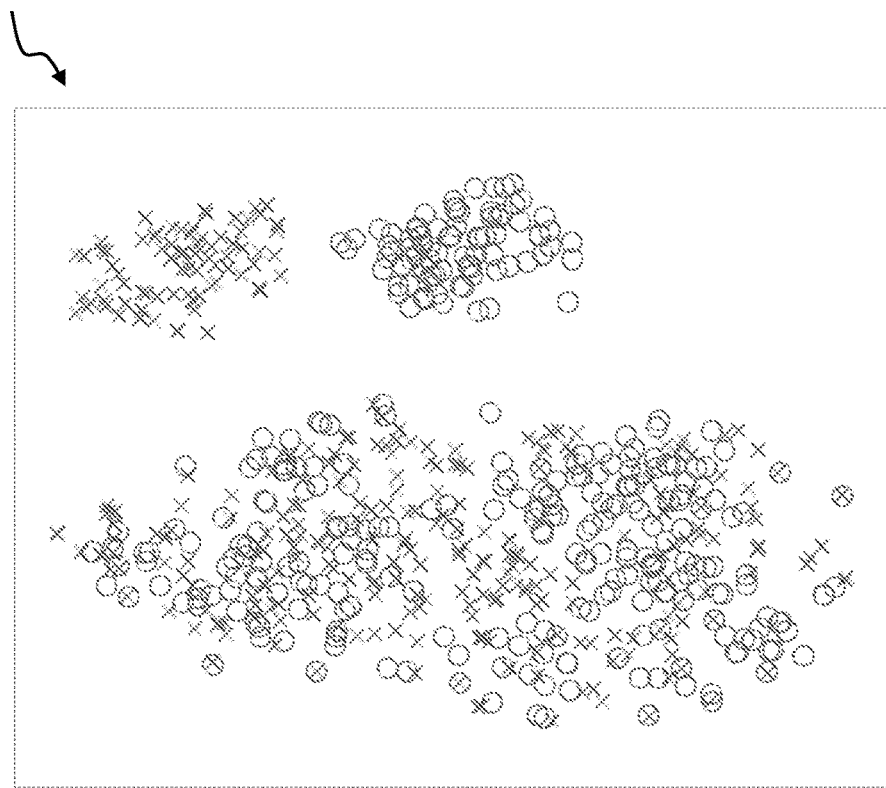
FIGS. 8A, 8B, and 8C illustrate feature distributions for an original image, feature distributions obtained from the CMDL technique, and feature distributions obtained from the proposed PCDL technique, respectively, according to an implementation of the present disclosure.
Figure 8B:
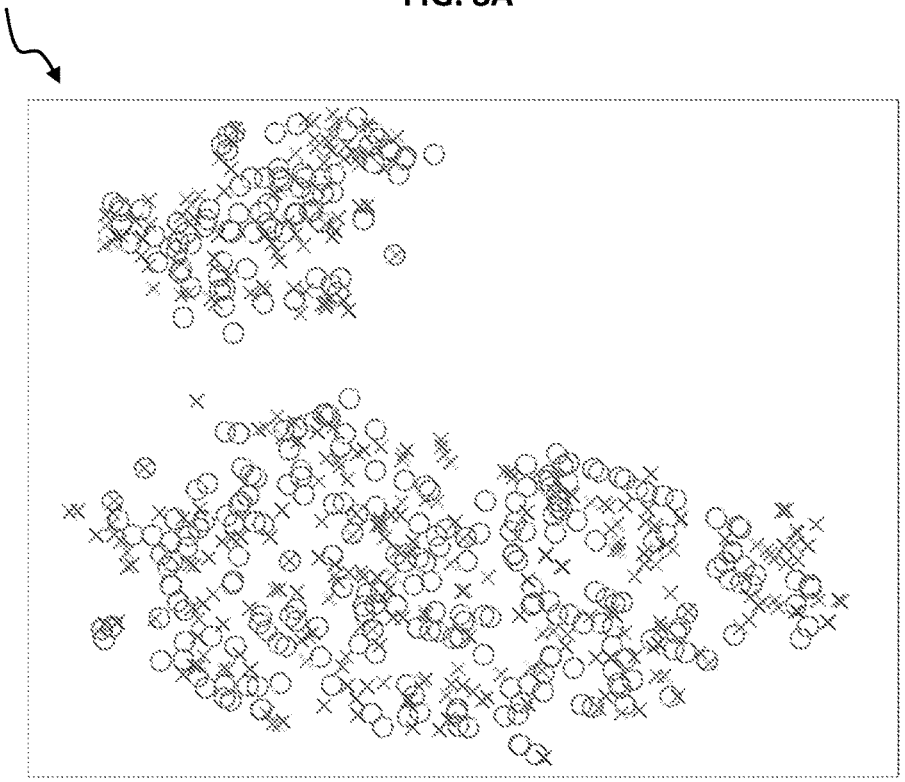
Figure 8C:
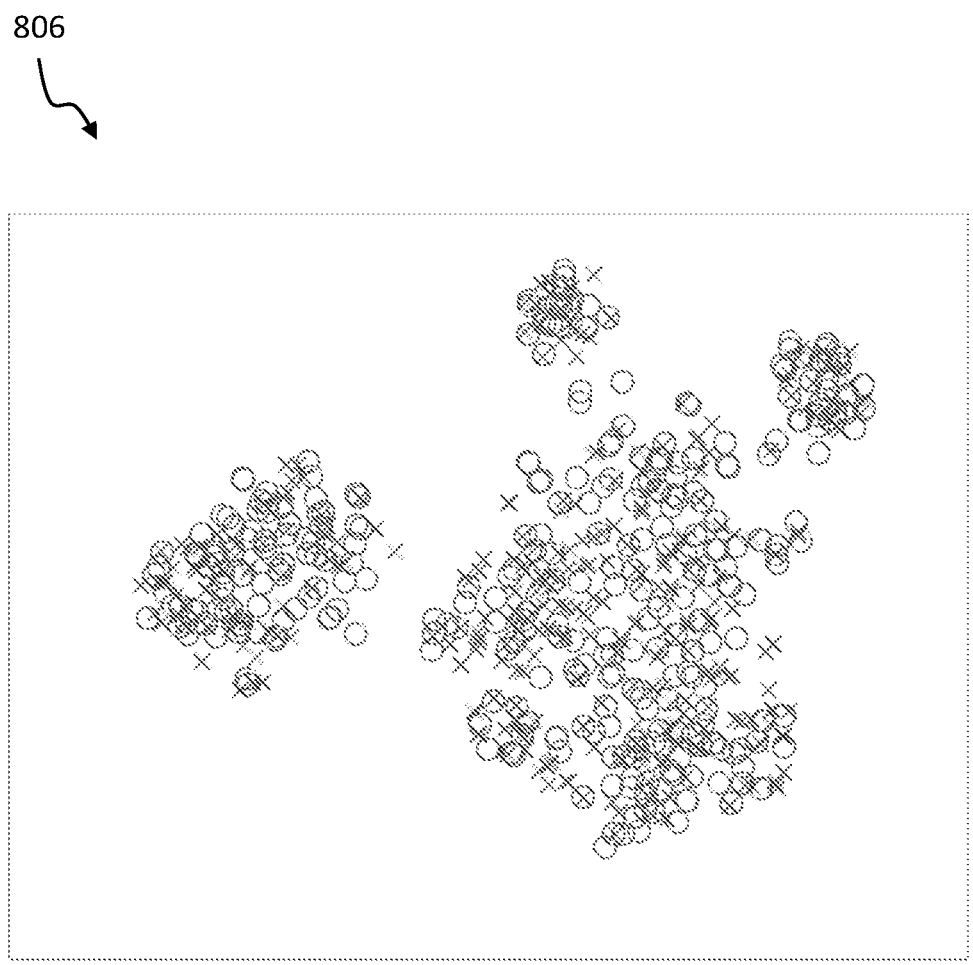

The feature distributions of PCDL_image and CMDL_image can also be visualized. FIGS. 8A, 8B, and 8C illustrate feature distributions 800 for an original image, feature distributions 802 obtained from the CMDL technique, and feature distributions 804 obtained from the low-dimensional space of the proposed PCDL technique, respectively, according to an implementation of the present disclosure. In obtaining the results shown in FIGS. 8A to 8C, PCA projection was used on the VIPeR dataset for 2D visualization. Furthermore, circles represent images from the first camera in the VIPeR dataset, and crosses represent images from the second camera in the VIPeR dataset. The measure of intra-person diversity can be gleaned by observing a degree of overlap between the circles and the crosses in a given figure. A greater degree of overlap indicates smaller intra-person diversity (and thus better performance). In the ideal case, the features of the same person from the first camera (indicated by the circles) and the second camera (indicated by the crosses) perfectly overlap. As seen in the feature distribution 804 shown in FIG. 8C, the degree of overlap of the features of the same person from the first and second cameras for the proposed PCDL technique is greater than for the original image (e.g., seen in feature distribution 800 in FIG. 8A) and the CMDL technique (e.g., seen in feature distribution 802 in FIG. 8B). Stated differently, the feature distributions 800, 802 shown in FIGS. 8A and 8B, respectively, are more dispersed than the feature distribution 804 shown in FIG. 8C. Consequently, the proposed PCDL technique makes the feature distribution of the same person more compact in the shared space, thereby reducing intra-person diversity.

Table 4 shows the matching rates by integrating features from different representation levels, where PCDL_(image+part) denotes the fusion results by integrating image-level and part-level representations.

TABLE 4

Top r matching rates (%) of fusion results.

| Methods | r = 1 | r = 5 | r = 10 | r = 20 |
| --- | --- | --- | --- | --- |
| CMDL_(image + part) | 60.33 | 87.31 | 93.52 | 96.88 |
| PCDL_(image + part) | 64.56 | 88.92 | 96.52 | 97.78 |
| CMDL_(image + patch) | 39.24 | 65.82 | 81.65 | 90.51 |
| PCDL_(image + patch) | 42.91 | 67.19 | 84.48 | 91.77 |
| CMDL_(part + patch) | 57.59 | 81.33 | 92.41 | 96.52 |
| PCDL_(part + patch) | 52.37 | 80.70 | 88.92 | 94.62 |

As seen in Table 4, by fusing image-level and part-level representations or fusing image-level and patch level representations, the proposed PCDL technique outperforms the currently available CMDL technique. With regards to integrations of part-level and patch-level representations, the CMDL technique obtains the highest matching rates on all ranks. A possible reason for this result may be that the image-level features capture the most discriminatory information between persons across the different camera views in the proposed PCDL technique. Therefore, by not including the image-level features, the advantage provided by the proposed PCDL technique is mitigated or reduced.

Figure 9:
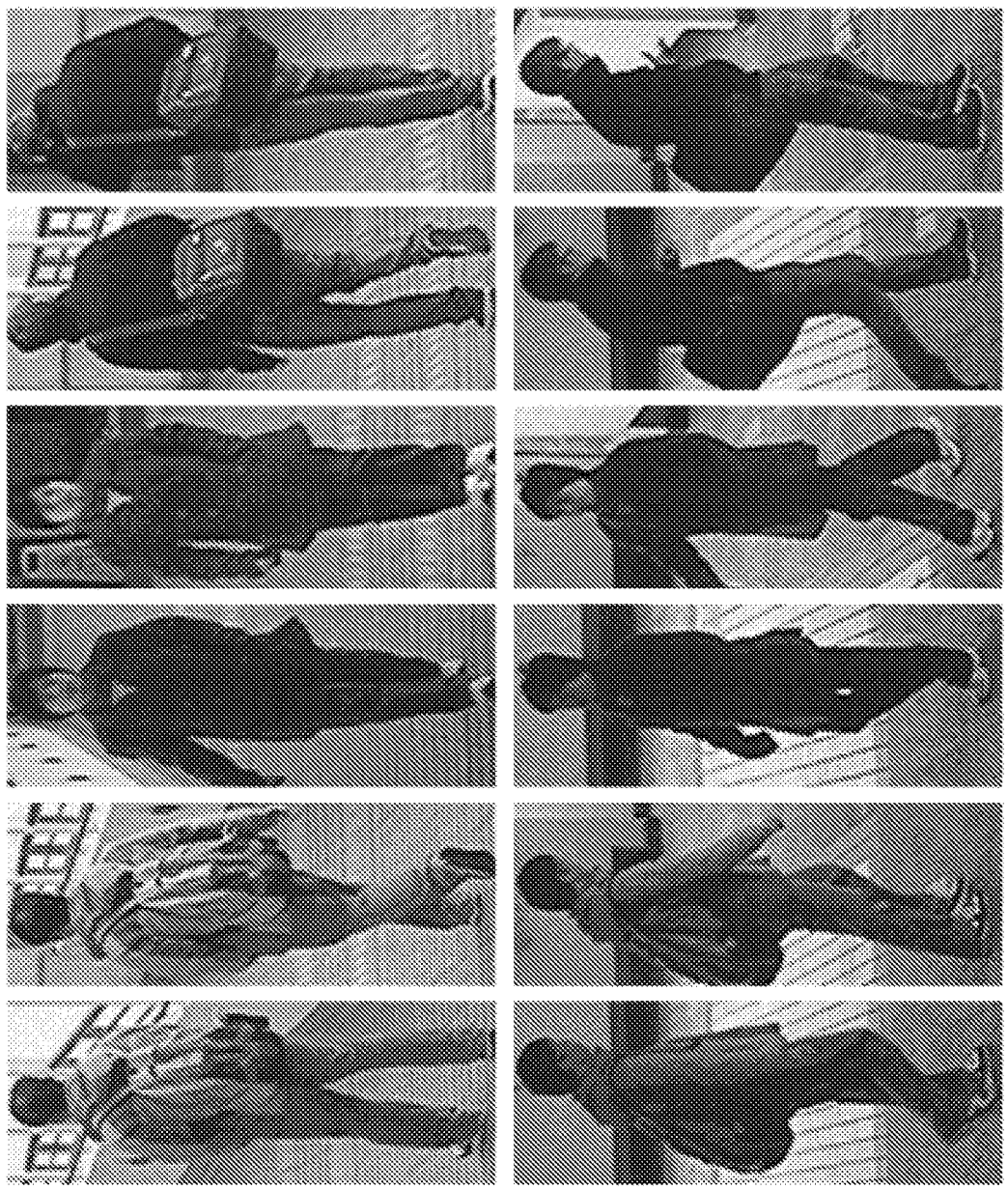
FIG. 9 shows example images from the CUHK01 Campus dataset, with the top row showing some images obtained by a first camera, and the bottom row showing some images obtained by a second camera.

CUHK01 Campus dataset: FIG. 9 shows example images from the CUHK01 Campus dataset, with the top row 902 showing some images obtained by a first camera, and the bottom row 904 showing some images obtained by a second camera. The CUHK01 Campus dataset includes images of 971 subjects taken from two cameras having disjointed or non-overlapping views. Each person has two images, which were collected in an outdoor environment. Each image can be resized to 160×60 pixels. These images have significant condition changes in illumination, pose, and view point in two camera views, as seen in the example images shown in FIG. 9. The CUHK01 dataset can be divided into two parts, without overlapping for each person. In the experiments using the CUHK01 dataset, half of the image pairs can be used for the training phase 302 of the process 300, and the other half can be used for the testing phase 304 of the process 300. Each person includes two images, and one image from one camera is exploited to build the probe set, and another image from a different camera is exploited to build the gallery set. Ten random trials can be repeated to get the average matching rates in the experiments.

Figure 10:
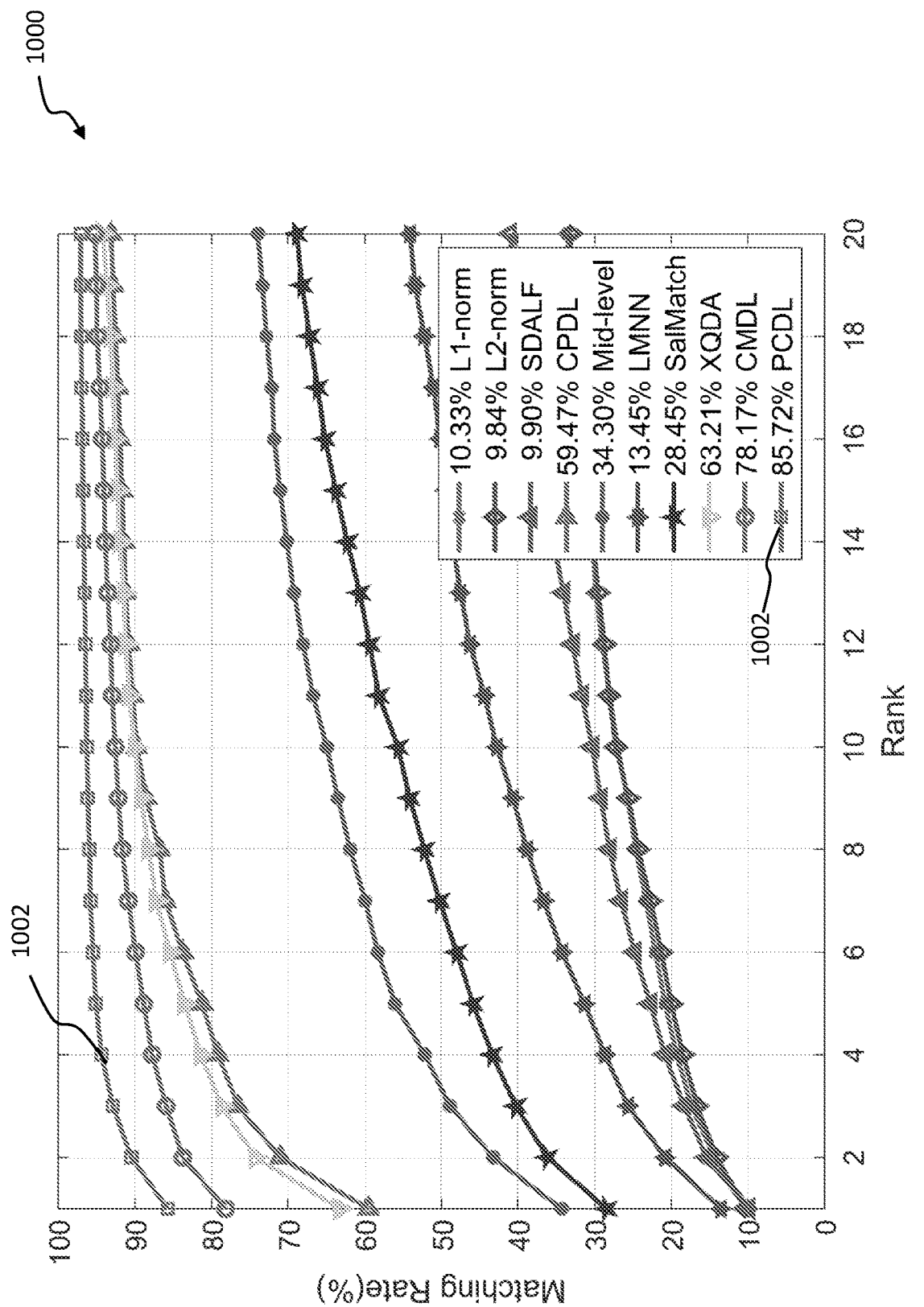
FIG. 10 shows a graph illustrating cumulative match characteristic curves for the proposed PCDL technique compared to other currently available techniques operating on the CUHK01 Campus dataset, according to an implementation of the present disclosure.

FIG. 10 is a graph 1000 illustrating CMC curves for the proposed PCDL technique compared to other currently available techniques operating on the CUHK01 Campus dataset, according to an implementation of the present disclosure. The horizontal axis of the graph 1000 illustrates rank, and the vertical axis of the graph 1000 illustrates matching rate in percentage. As seen in FIG. 10, the performance of the proposed PCDL technique (illustrated by curve 1002) is better than all compared techniques over all ranks. For the experiments using the CUHK01 Campus dataset, Table 5 shows the average matching rates for all compared techniques on Ranks 1, 5, 10, and 20.

TABLE 5

Top r matching rates (%) on CUHK01 dataset.

| Methods | r = 1 | r = 5 | r = 10 | r = 20 |
|---|---|---|---|---|
| SDALF | 9.90 | 22.57 | 30.33 | 41.03 |
| MLAPG | 64.24 | N/A | 90.84 | 94.92 |
| ITML | 15.98 | 35.22 | 45.60 | 59.80 |
| LMNN | 13.45 | 31.33 | 42.25 | 54.11 |
| XQDA | 63.21 | 83.5 | 90.04 | 94.16 |
| Mirror-KMFA | 40.40 | 64.63 | 75.34 | 84.08 |
| WLC | 65.8 | 81.1 | 85.9 | — |
| CPDL | 59.47 | 81.26 | 89.72 | 93.1 |
| HGDs | 65.9 | 84.6 | 90.3 | 95.1 |
| CMDL | 78.17 | 88.85 | 92.55 | 95.21 |
| CRAFT | 74.5 | 91.2 | 94.8 | 97.1 |
| CVPR-2018 | 82.5 | 96.1 | 98.2 | 99.0 |
| PCDL | 85.72 | 95.08 | 96.36 | 97.05 |

As seen in Table 5, the proposed PCDL technique outperforms the CMDL technique on all Ranks and achieves the highest performance on Rank 1. In addition, the proposed PCDL technique achieves the second highest performance on Ranks 5, 10 and 20, with the CVPR-2018 technique obtaining the highest performance on ranks 5, 10 and 20. Since Rank 1 can be the most important evaluation criteria, the proposed PCDL technique is competitive and superiro compared to all compared techniques on the Rank 1 dataset.

Figure 11:
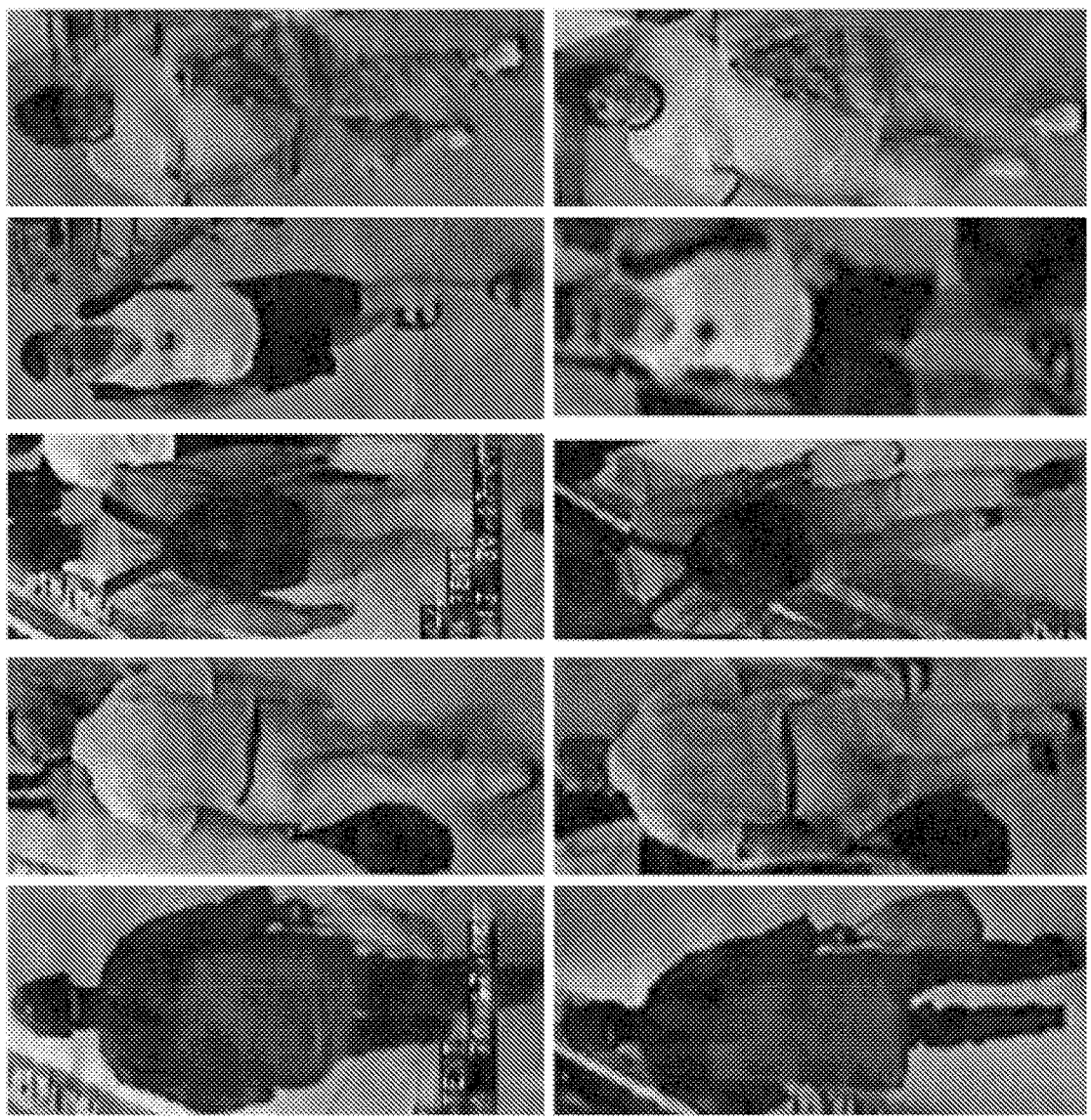
FIG. 11 shows example images from the GRID dataset, with the top row showing some images obtained by a first camera, and the bottom row showing some images obtained by a second camera.

GRID dataset: FIG. 11 shows example images from the GRID dataset, with the top row 1102 showing some images obtained by a first camera, and the bottom row 1104 showing some images obtained by a second camera. The GRID dataset includes image pairs for 250 persons. Two images in each person are collected from two different views. 775 redundant images that do not overlap with the 250 persons are also included in the GRID dataset. In the experiments, 125 image pairs can be randomly chosen for the training phase 302 of the process 300. The other image pairs can be used for the testing phase 304 of the process 300, including the 775 redundant images. Ten random trials can be repeated to get the average matching rates in the experiments. Table 6 shows the average matching rates for all compared techniques on Ranks 1, 5, 10, and 20.

TABLE 6

Top r matching rates (%) on GRID dataset.

| Methods | r = 1 | r = 5 | r = 10 | r = 20 |
|---|---|---|---|---|
| MLAPG | 16.64 | — | 41.20 | 52.96 |
| SCSP | 24.24 | 44.56 | 54.08 | 65.20 |
| HGDs | 30.6 | 52.6 | 63.9 | 74.0 |
| XQDA | 16.56 | — | 41.84 | 52.40 |
| CPDL | 21.60 | 45.85 | 61.05 | 65.80 |
| CMDL | 30.88 | 56.88 | 67.76 | 78.48 |
| CRAFT | 26.0 | 50.6 | 62.5 | 73.3 |
| PCDL | 33.4 | 62.6 | 75.5 | 87.2 |

Figure 12:
FIG. 12 shows example images from the iLIDS dataset, with the top row showing some images obtained by a first camera, and the bottom row showing some images obtained by a second camera.

As seen in Table 6, similar to the conclusions on the VIPeR and CUHK01 datasets, the proposed PCDL technique obtains the highest performance on all ranks. Specifically, the proposed PCDL technique achieves 2.5% and 7.4% improvements over the CMDL and CVPR-2018 techniques on Rank 1, respectively.

iLIDS dataset: FIG. 12 shows example images from the iLIDS dataset, with the top row 1202 showing some images obtained by a first camera, and the bottom row 1204 showing some images obtained by a second camera. The iLIDS dataset includes 479 images of 119 persons, where images are captured from an airport arrival hall with non-overlapping cameras. Images in this dataset contain significant variations in illumination and occlusion in the two different camera views, as seen in the example images shown in FIG. 12. Each image can be resized to 128×64 pixels in the experiments. For the experiments using the iLIDS dataset, one image for each person from each view is randomly chosen to build the gallery and probe image sets. Ten random trials can be repeated to get the average matching rates in the experiments. Table 7 shows the average matching rates for all compared techniques on Ranks 1, 5, 10, and 20.

TABLE 7

Top r matching rates (%) on iLIDS dataset.

| Methods | r = 1 | r = 5 | r = 10 | r = 20 |
|---|---|---|---|---|
| PCCA | 24.1 | 53.3 | 69.2 | 84.8 |
| LF | 32.2 | 56.0 | 68.7 | 81.6 |
| KISSME | 28.0 | 54.2 | 67.9 | 81.6 |
| KLFDA | 36.9 | 65.3 | 78.3 | 89.4 |

TABLE 7-continued

Top r matching rates (%) on iLIDS dataset.

| Methods | r = 1 | r = 5 | r = 10 | r = 20 |
|---|---|---|---|---|
| CPDL | 39.5 | 65.4 | 78.5 | 88.2 |
| eSalMatch | 44.56 | 72.10 | 83.50 | — |
| CMDL | 45.1 | 66.7 | 79.2 | 90.1 |
| PCDL | 49.2 | 71.7 | 83.7 | 91.3 |

As seen in Table 7, similar to the conclusions on the VIPeR, CUHK01, and GRID datasets, the proposed PCDL technique obtains the highest performance on all ranks, thus demonstrating the efficacy, accuracy, and advantage of the proposed PCDL technique in complex environments with occlusions and illumination variations.

Figure 13:
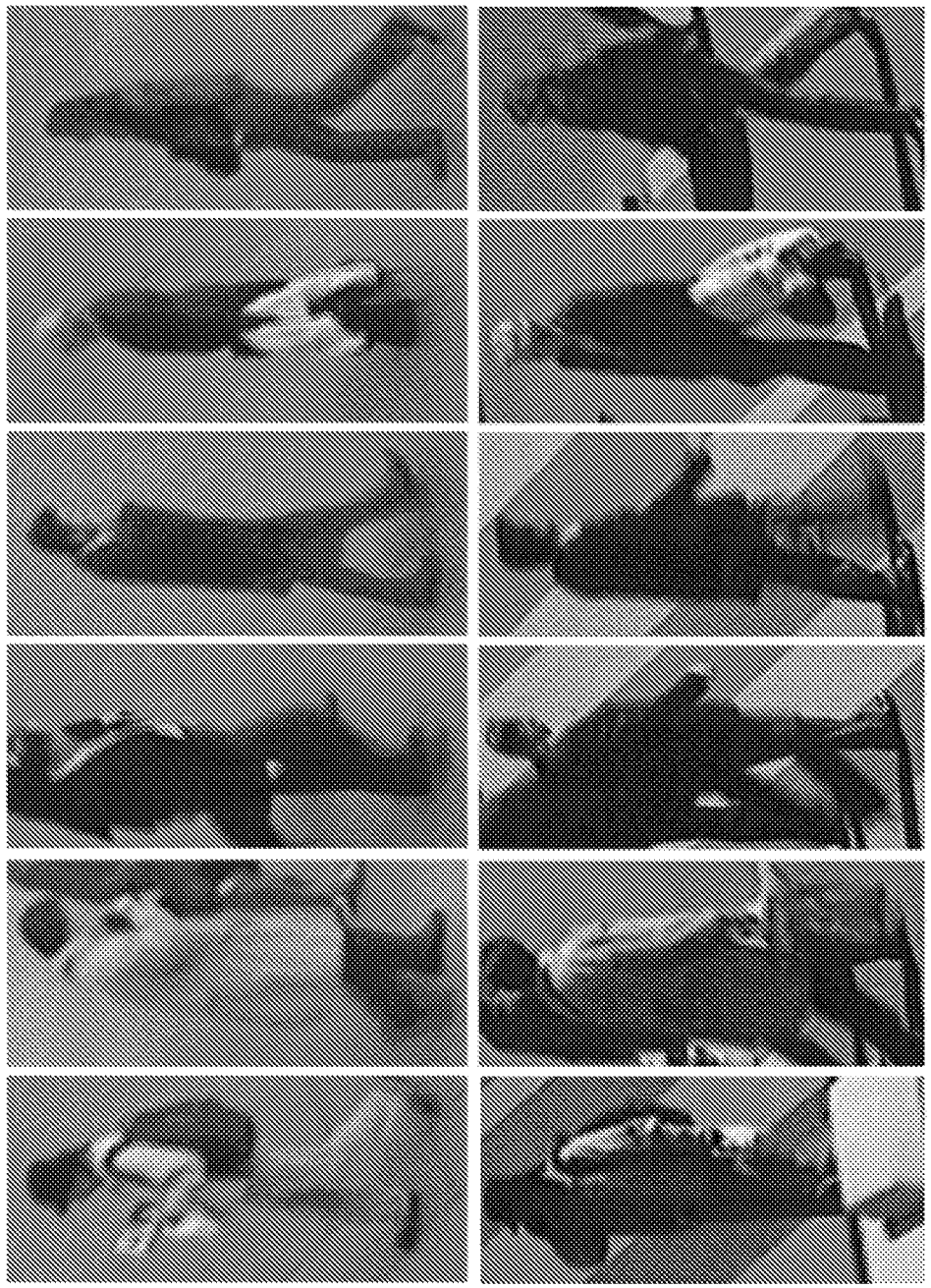
FIG. 13 shows example images from the PRID 450 dataset, with the top row showing some images obtained by a first camera, and the bottom row showing some images obtained by a second camera.

PRID 450 dataset: FIG. 13 shows example images from the PRID 450 dataset, with the top row 1302 showing some images obtained by a first camera, and the bottom row 1304 showing some images obtained by a second camera. The PRID 450 dataset includes 450 image pairs captured from two non-overlapping cameras. Images in this dataset contain viewpoint differences and partial occlusions, as seen in the example images shown in FIG. 13. Each image can be resized to 128×48 pixels in the experiments. Ten random trials can be repeated to get the average matching rates in the experiments. For each trial, 225 image pairs can be chosen for the training phase 302 of the process 300. The other image pairs can be used for the testing phase 304 of the process 300. Table 8 shows the average matching rates for all compared techniques on Ranks 1, 5, 10, and 20.

TABLE 8

Top r matching rates (%) on PRID450S dataset.

| Methods | r = 1 | r = 5 | r = 10 | r = 20 |
|---|---|---|---|---|
| ITML | 21 | 53 | 67 | 84 |
| LMNN | 24 | 62 | 73 | 87 |
| SCSP | 42 | 67 | 79 | 88 |
| LOMO + XQDA | 59 | 84 | 90 | 95 |
| KISSME | 28.0 | 54.2 | 67.9 | 81.6 |
| CPDL | 48 | 80 | 89 | 95 |
| Mirror-KMFA | 55 | 79 | 88 | 92 |
| CMDL | 52 | 83 | 90 | 96 |
| PCDL | 71 | 92 | 96 | 98 |

As seen in Table 8, similar to the conclusions on the VIPeR, CUHK01, GRID, and iLIDS datasets, the proposed PCDL technique obtains the highest performance on all ranks, thus demonstrating the efficacy, accuracy, and advantage of the proposed PCDL technique in complex environments with viewpoint differences and partial occlusions. In particular, the proposed PCDL technique achieves 19% improvement over the CMDL technique on Rank 1 datasets.

Parameter Analysis

As discussed above, the proposed PCDL technique includes several parameters for the image-level representations and the part-level representations, such as $\lambda_1^{image}$, $\lambda_2^{image}$, $\eta_{image}$, $\lambda_1^{part}$, $\lambda_2^{part}$ and $\eta_{part}$. Parameters $\lambda_1^{image}$ and $\lambda_2^{image}$ can control the power of view-specific projection learning terms in different levels. Parameters $\lambda_2^{image}$ and $\lambda_2^{part}$ can control the effect of view consistency in different levels. Parameters $\eta_{image}$ and $\eta_{part}$ are regularization parameters. In addition, $\gamma_1$ and $\gamma_2$ are parameters for the fusion strategy. In this section, the effects of these parameters on the performance of the proposed PCDL technique are discussed. The VIPeR dataset can be used in all experiments investigating the effect of these parameters on the performance of the proposed PCDL technique. Furthermore, when testing one parameter, other parameters can be fixed or held constant.

Figure 14:
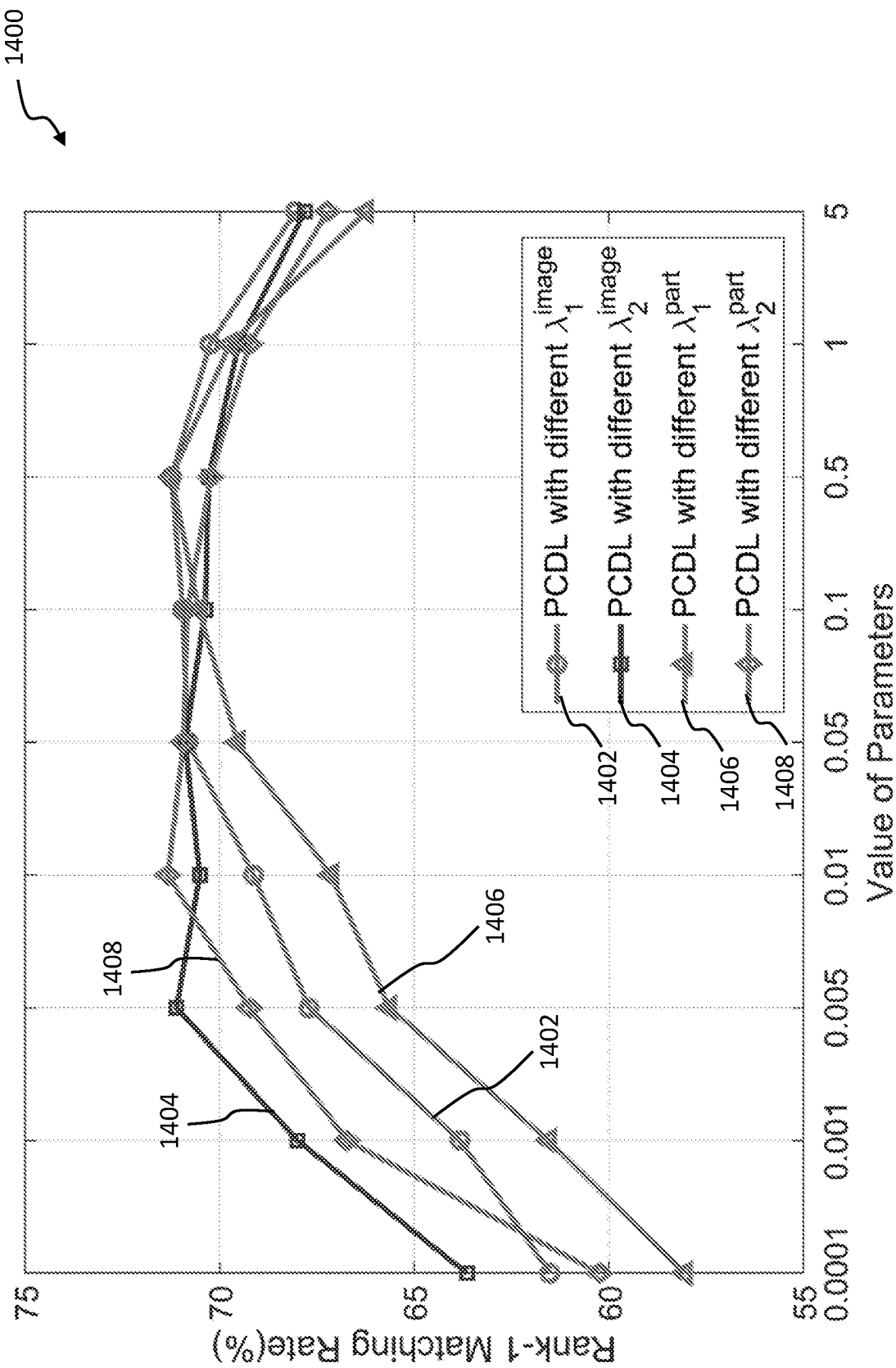
FIG. 14 shows a graph illustrating the Rank 1 matching performance for different values of parameters $\lambda_1$ and $\lambda_2$ of the proposed PCDL technique, according to an implementation of the present disclosure.

FIG. 14 shows a graph 1400 illustrating the Rank 1 matching performance for different values of parameters $\lambda_1$ and $\lambda_2$ of the proposed PCDL technique, according to an implementation of the present disclosure. The horizontal axis of graph 1400 denotes values of parameters $\lambda_1$ and $\lambda_2$, and the vertical axis of graph 1400 denotes the matching rate expressed as a percentage. As seen in FIG. 14, as the values of parameters $\lambda_1$ and $\lambda_2$ increase, the proposed PCDL technique also improved (e.g., as seen in the increasing matching rate). The proposed PCDL technique achieves stable performance when parameters $\lambda_1^{image}$ and $\lambda_1^{part}$ vary in the range [0.1, 1], parameter $\lambda_2^{image}$ varies in the range [0.005,0.05], and parameter $\lambda_2^{part}$ varies in the range [0.01, 0.1]. However, as seen in the graph 1400, continuing to increase the values of parameters $\lambda_1$ and $\lambda_2$ causes the performance of the proposed PCDL technique to decrease gradually (e.g., as seen in the decreasing matching rate).

Figure 15:
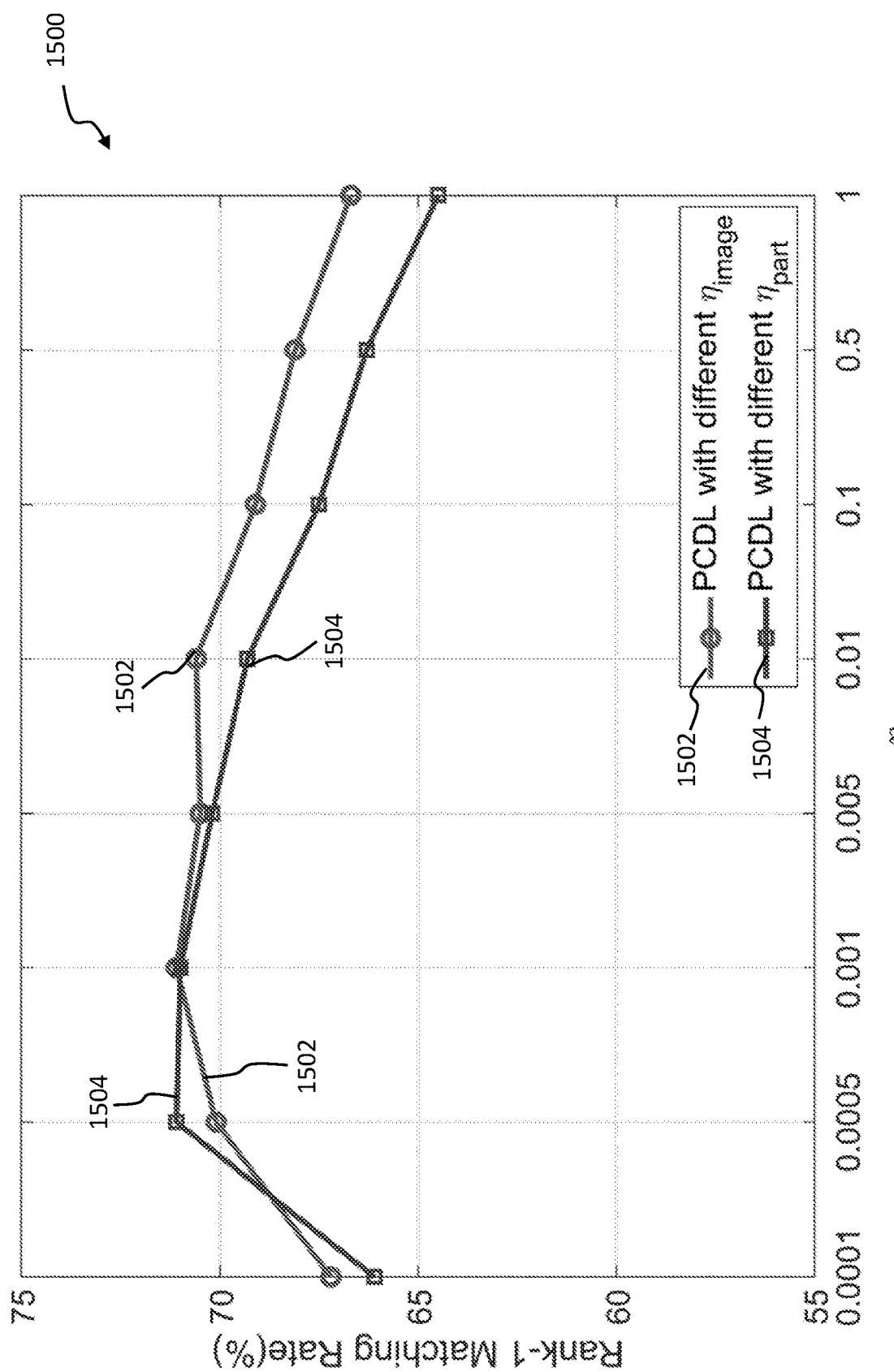
FIG. 15 shows a graph illustrating the Rank 1 matching performance for different values of parameter $\eta$ of the proposed PCDL technique, according to an implementation of the present disclosure.

FIG. 15 shows a graph 1500 illustrating the Rank 1 matching performance for different values of parameter $\eta$ of the proposed PCDL technique, according to an implementation of the present disclosure. The horizontal axis of graph 1500 denotes values of parameter $\eta$, and the vertical axis of graph 1500 denotes the matching rate expressed as a percentage. As seen in FIG. 15, the proposed PCDL technique achieves the best matching results (e.g., as seen in the maximum matching rate) when parameters $\eta_{image}$ and $\eta_{part}$ are set to $1\times10^{-3}$ and $5\times10^{-4}$, respectively.

Figure 16:
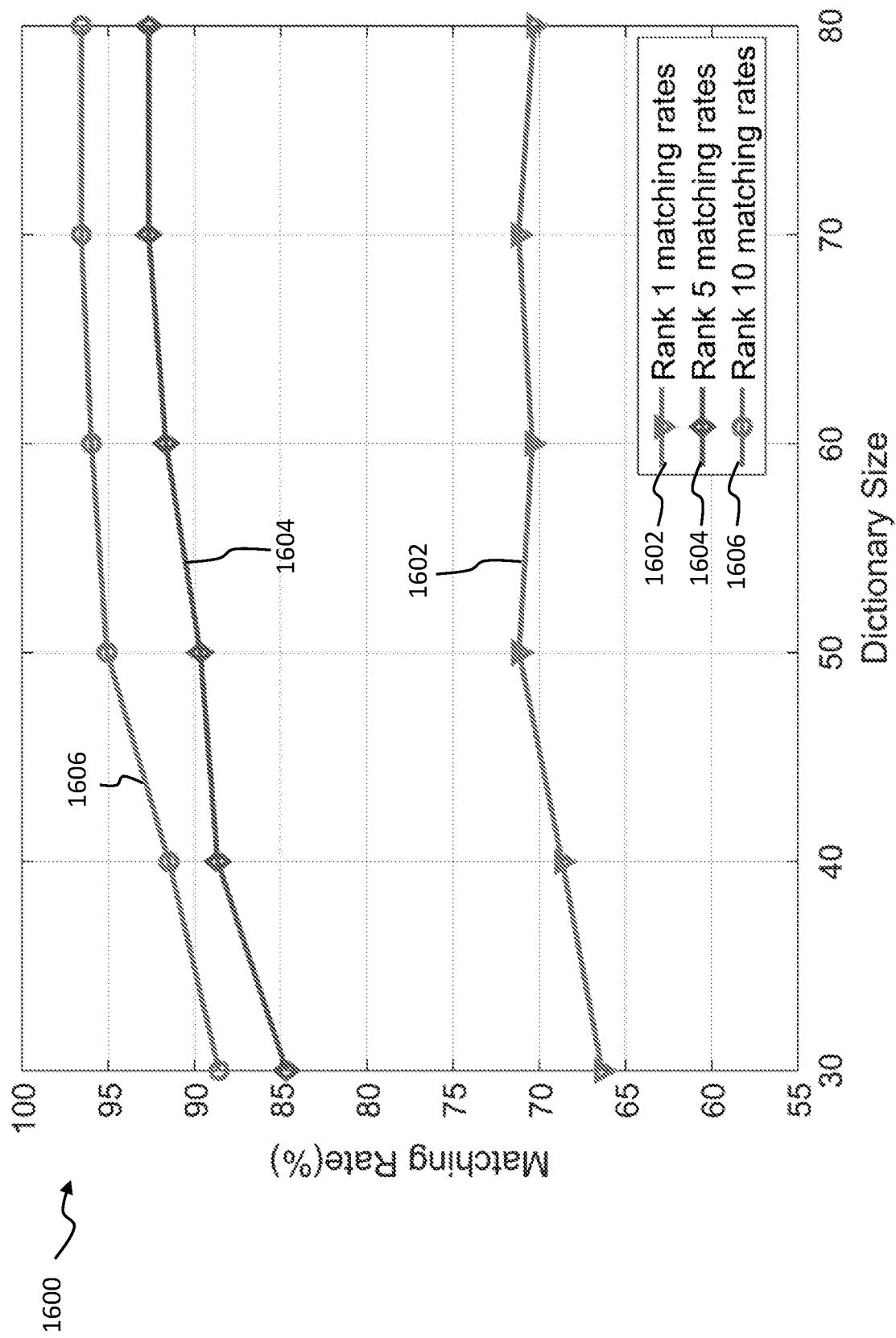
FIG. 16 shows a graph illustrating the Ranks 1, 5, and 10 matching performances for different common dictionary sizes of the proposed PCDL technique, according to an implementation of the present disclosure.

As discussed above, an objective of the training phase 302 is to determine a shared K-atoms dictionary $D \in R^{d \times K}$ and mappings $P_{(1)} \in R^{d \times m}$ and $P_{(2)} \in R^{d \times m}$ onto the shared, low-dimensional feature space 314, which can minimize the representation error in the shared feature space 314. In the proposed PCDL technique, the image-level and part-level representations utilize the same dictionary size K. FIG. 16 shows a graph 1600 illustrating the Ranks 1, 5, and 10 matching performances for different common dictionary sizes of the proposed PCDL technique, according to an implementation of the present disclosure. The horizontal axis of graph 1600 denotes values of parameter K, and the vertical axis of graph 1600 denotes the matching rate expressed as a percentage. As seen in FIG. 16, the proposed PCDL technique achieves stable performance over a range of dictionary sizes K (e.g., greater than or equal to 70). In the experiments discussed in a previous section, the dictionary size K can be set to 70 for all datasets.

Figure 17A:
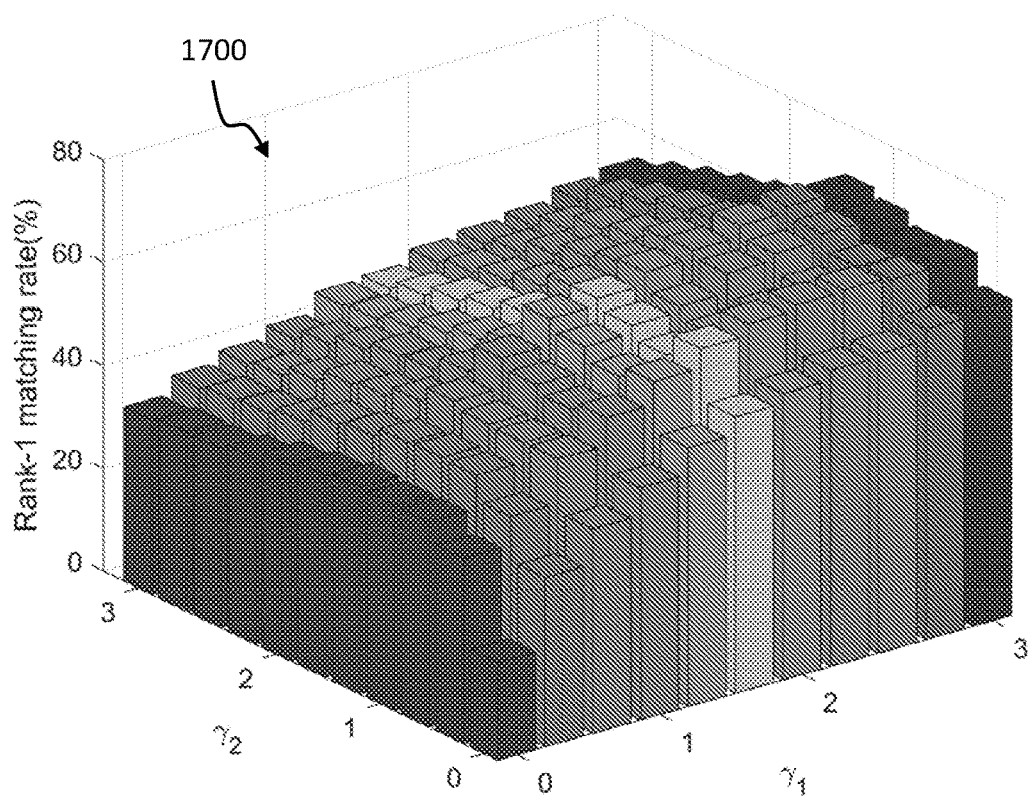
FIG. 17A shows a three-dimensional plot illustrating the Rank 1 matching performance for different values of parameters $\gamma_1$ and $\gamma_2$ of the proposed PCDL technique, according to an implementation of the present disclosure.
Figure 17B:
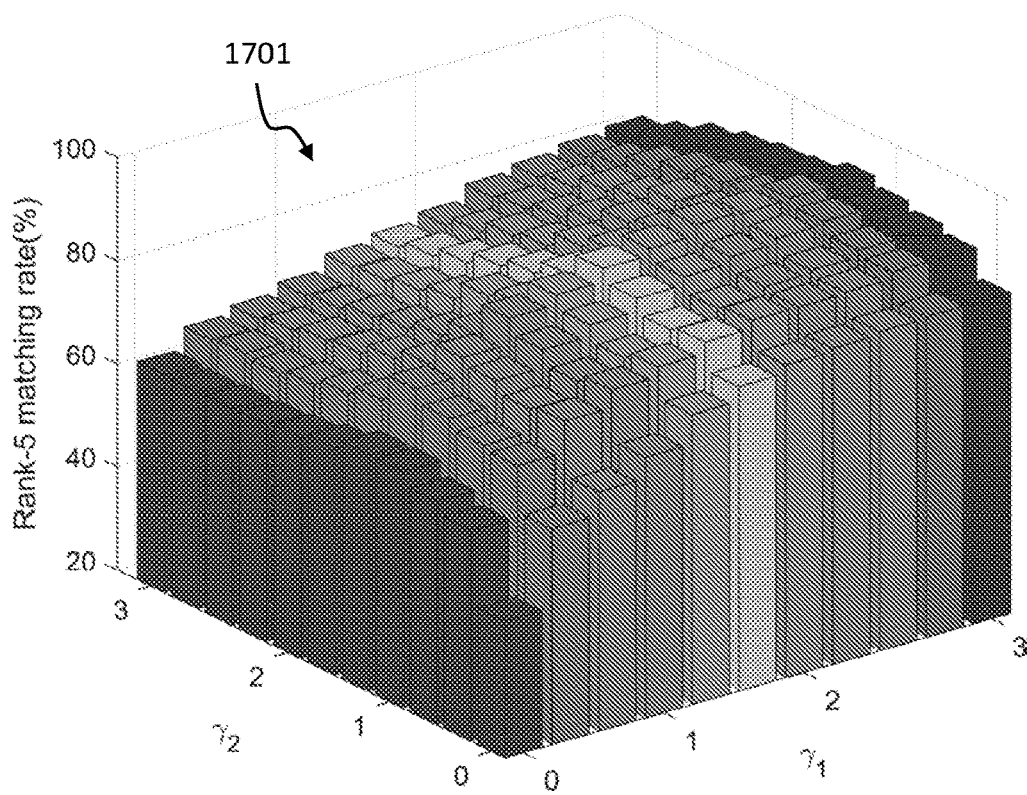
FIG. 17B shows a three-dimensional plot illustrating the Rank 5 matching performance for different values of parameters $y_1$ and $y_2$ of the proposed PCDL technique, according to an implementation of the present disclosure.

The effect of the values of parameters $\gamma_1$ and $\gamma_2$ for the fusion strategy can also be evaluated. FIG. 17A shows a three-dimensional plot 1700 illustrating the Rank 1 matching performance for different values of parameters $y_1$ and $y_2$ of the proposed PCDL technique, according to an implementation of the present disclosure. FIG. 17B shows a three-dimensional plot 1701 illustrating the Rank 5 matching performance for different values of parameters $\gamma_1$ and $\gamma_2$ of the proposed PCDL technique, according to an implementation of the present disclosure. In each of the plots 1700 and 1701, the horizontal axes denote values of parameters $\gamma_1$ and $\gamma_2$, and the vertical axes denote the matching rate expressed as a percentage. As seen in FIGS. 17A and 17B, the performance of the proposed PCDL technique is low (e.g., as seen in the low matching rate) when both parameters $\gamma_1$ and $\gamma_2$ are set to 0. This illustrates that the part-level representation and image-level representation play an important role for the task of person re-ID. Furthermore, for both Rank 1 and Rank 5 matching performance, the proposed PCDL technique achieves the highest matching rate when parameter $y_1=2.8$ and parameter $y_2=1.2$. This illustrates that the part-level representation is more important than image-level representation for the task of person re-ID.

Figure 18:
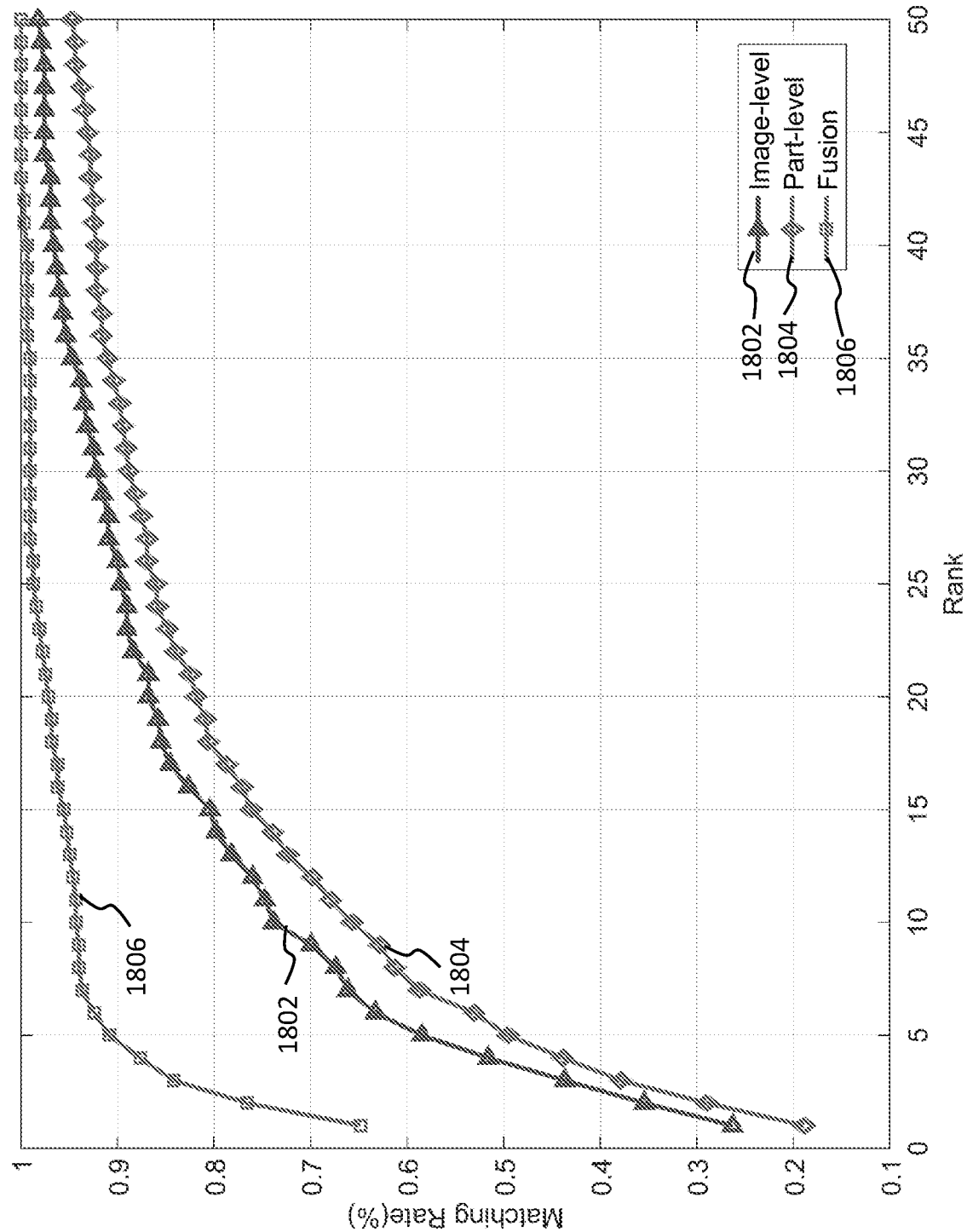
FIG. 18 shows a graph illustrating cumulative match characteristic curves for the image-level representation, part-level representation, and fusion of these representations for the proposed PCDL technique operating on the VIPeR dataset, according to an implementation of the present disclosure.

The effect of different feature representation levels (e.g., image-level, part-level, fusion) can also be investigated. FIG. 18 shows a graph 1800 illustrating cumulative match characteristic curves for the image-level representation, part-level representation, and fusion of these representations for the proposed PCDL technique operating on the VIPeR dataset, according to an implementation of the present disclosure. In the graph 1800, the horizontal axis denotes Rank values and the vertical axis denotes the matching rate expressed as a percentage.

As seen in FIG. 18, the performance of the proposed PCDL technique for the image-level representation (e.g., as seen in the matching rates for curve 1802) is complementary to the performance of the proposed PCDL technique for the part-level representation (e.g., as seen in the matching rates for curve 1804) for all Ranks. Furthermore, the performance of the proposed PCDL technique for the fusion of the image-level and part-level representation (e.g., as seen in the matching rates for curve 1806) is significantly better than both curves 1802 and 1804 for all Ranks.

Model Analysis

As discussed above, the expressions $P_{(1)} \in R^{d \times m}$ and $P_{(2)} \in R^{d \times m}$ are projections for the image set obtained from the first camera and for the image set obtained from the second camera, respectively. In this section, the view-specific projections $P_{(1)}$ and $P_{(2)}$ are separately exploited to decrease the intra-person diversity in the first and second cameras. In this section, to illustrate the performances of the feature projection matrices $P_{(1)}$ and $P_{(2)}$, the view-specific projections $P_{(1)}$ and $P_{(2)}$ are removed from the objective function (e.g., shown in Equation (13)), and this modified objective function is denoted as PCDL_noP. The proposed PCDL technique operating with the desired objective function (e.g., shown in Equation (13)) on image-level representations is denoted as PCDL_image. The proposed PCDL technique operating with common (e.g., equal) feature projection matrices $P_{(1)}$ and $P_{(2)}$ and a common dictionary for both views is denoted as PCDL_comP. Table 9 shows the average Rank 1, 5, 10, and 20 matching results of PCDL_image and PCDL_noP on the image-level representations for the VIPeR dataset.

TABLE 9

Top r matching rates (%) of PCDL_comP and PCDL_noP on VIPeR dataset.

| VIPeR | r = 1 | r = 5 | r = 10 | r = 20 |
|---|---|---|---|---|
| PCDL_noP | 20.62 | 53.27 | 67.76 | 81.28 |
| PCDL_comP | 22.15 | 54.34 | 69.14 | 83.54 |
| PCDL_image | 26.28 | 58.42 | 73.87 | 86.78 |

As seen in Table 9, PCDL_image obtains better performance than PCDL_noP. This indicates that learning view-specific projections improves the discriminatory capability of the generated representation coefficients. Particularly, the Rank 1 matching performance is improved by 5.66% on VIPeR dataset by using feature projection matrices $P_{(1)}$ and $P_{(2)}$. Furthermore, as seen in Table 9, PCDL_image obtains better performance than PCDL_comP. This indicates that using view-specific projection matrices can reduce the differences observed for the same person in different views.

Figure 19:
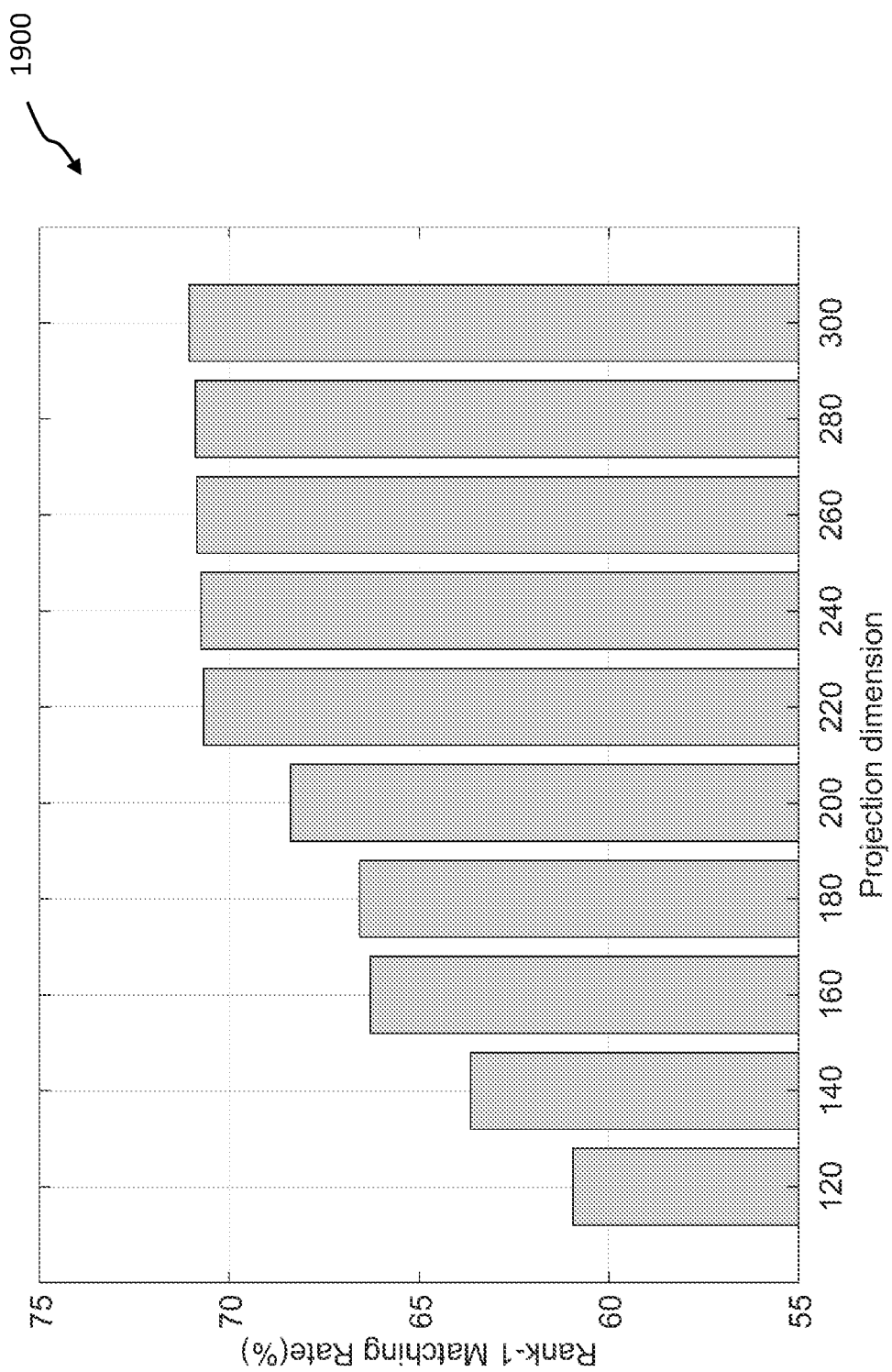
FIG. 19 shows a graph illustrating the Rank 1 matching performance for different values of the feature dimension of the proposed PCDL technique operating on the VIPeR dataset, according to an implementation of the present disclosure.

As discussed above, the expressions $X_{(1)}=[x_1^{(1)}, \ldots, x_n^{(1)}] \in R^{m \times n}$ and $X_{(2)}=[x_1^{(2)}, \ldots, x_n^{(2)}] \in R^{m \times n}$ denote two image sets collected from two different cameras or views, where m is the feature dimension (also referred to as the projection dimension). This section also evaluates the effect of projection dimension on the performance of the proposed PCDL technique. FIG. 19 shows a graph 1900 illustrating the Rank 1 matching performance for different values of the feature dimension of the proposed PCDL technique operating on the VIPeR dataset, according to an implementation of the present disclosure. In the graph 1900, the horizontal axis denotes feature dimension values and the vertical axis denotes the matching rate expressed as a percentage. As seen in FIG. 19, the performance of the proposed PCDL technique increases (e.g., as seen in the increasing matching rates) as the feature dimension is increased. Performance gains plateau when the feature dimension is 220, thus indicating that the proposed PCDL technique achieves stable, substantially constant performance when the feature dimension greater than or equal to 220.

Figure 20A:
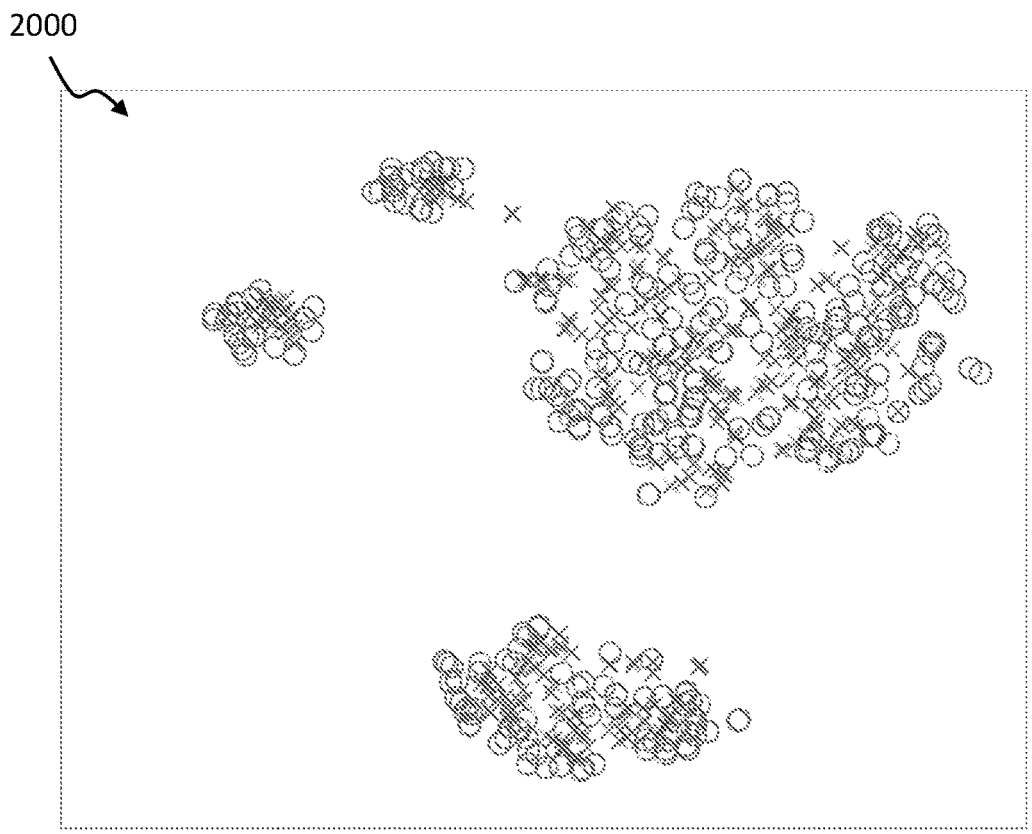
FIGS. 20A and 20B illustrate feature distributions for view-specific dictionaries and a common dictionary, respectively, according to an implementation of the present disclosure.
Figure 20B:
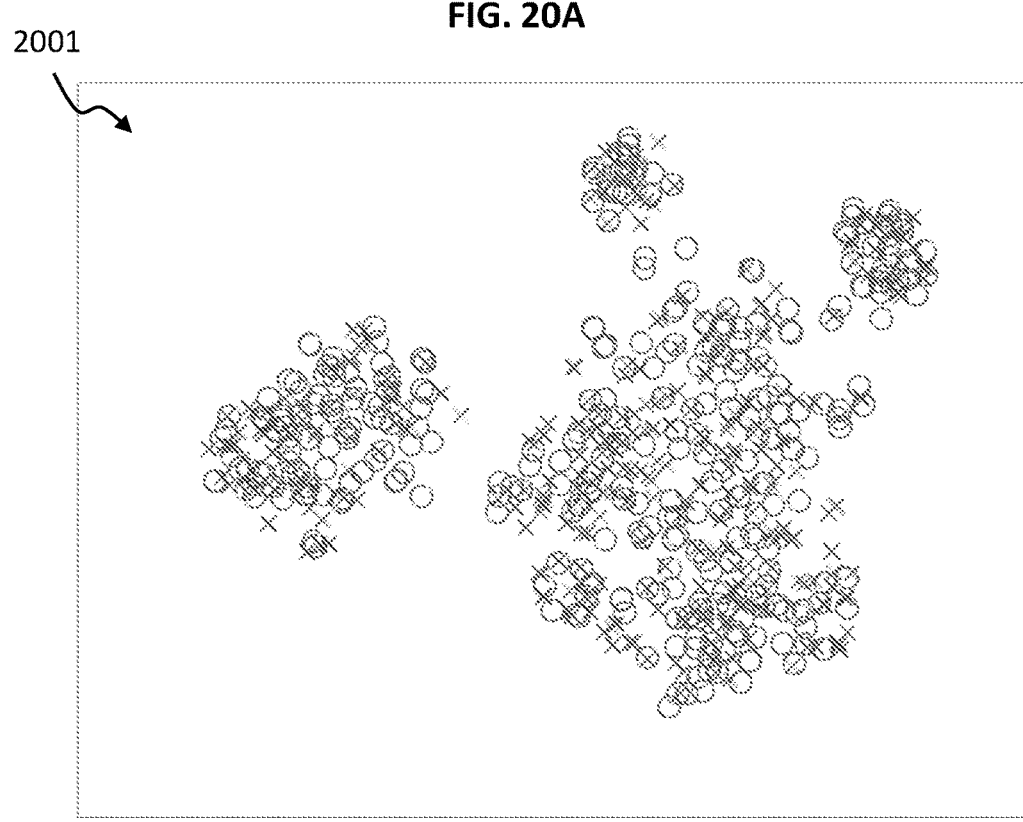

In the proposed PCDL technique, a shared common dictionary is determined. In some currently available techniques, view-specific dictionaries are used (e.g., a respective, different dictionary is used for the image set obtained from a respective camera). This section also demonstrates that the proposed use of a shared common dictionary is more effective, more accurate, and advantageous compared to using view-specific dictionaries. To illustrate this, the objective function of the proposed PCDL technique (e.g., shown in Equation (13)) is modified to learn view-specific dictionaries, and this modified objective function is denoted as PDL_image. FIGS. 20A and 20B illustrate feature distributions 2000, 2001 for view-specific dictionaries and a common dictionary, respectively, according to an implementation of the present disclosure. In obtaining the results shown in FIGS. 20A and 20B, the techniques operated on the VIPeR dataset for 2D visualization. Furthermore, circles represent images from the first camera in the VIPeR dataset, and crosses represent images from the second camera in the VIPeR dataset. The measure of intra-person diversity can be gleaned by observing a degree of overlap between the circles and the crosses in a given figure. A greater degree of overlap indicates smaller intra-person diversity (and thus better performance). In the ideal case, the features of the same person from the first camera (indicated by the circles) and the second camera (indicated by the crosses) perfectly overlap. The feature distribution 2001 shown in FIG. 20B illustrates a greater degree of overlap between the circles and crosses compared to the feature distribution 2000 shown in FIG. 20A (which shows almost no overlap). Stated differently, the feature distribution 2000 shown in FIG. 20A is more dispersed than the feature distribution 2001 shown in FIG. 20B. Consequently, the proposed PCDL technique makes the feature distribution of the same person more compact in the shared space, thereby reducing intra-person diversity.

Multi-view Experiment

As mentioned above, a multi-view dataset (the WARD dataset) was also used to demonstrate the efficacy, accuracy, and advantage of the proposed PCDL technique. This section provides the results of the experiments that show the efficacy, accuracy, and advantage of the proposed PCDL technique. The WARD dataset includes 4786 images of 70 different individuals collected from three different cameras with non-overlapping views. These three cameras can be denotes as A, B and C, and the size of each image can be 128×48 pixels.

In the multi-view experiment, the WARD dataset can be randomly divided into two equal parts, where each part includes 35 persons. One part can be used for the training phase 302 of the process 300, and the other part can be used for the testing phase 304 of the process 300. The experiment can consider a single-shot setting where for each person, one image is randomly chosen in each view (e.g., from each camera A, B, C). In the experiment, ten random trials are performed to get the average matching results. Cameras A-B refers to images from Camera A being as the probe set and images from Camera B being used as the gallery set. Cameras B-C refers to images from Camera B being as the probe set and images from Camera C being used as the gallery set. Cameras A-C refers to images from Camera A being as the probe set and images from Camera C being used as the gallery set. Furthermore, since the currently available CMDL technique considers a two-view setting (e.g., only two cameras), the CMDL technique is extended in this experiment to deal with multi-view issues (and is denoted as M-CMDL). Table 10 shows average the Rank 1, 5, 10, and 20 matching results of the proposed PCDL technique for multiple cameras (denoted as M-PCDL) and the M-CMDL technique for the WARD dataset.

TABLE 10

Top r matching rates (%) of multi-view on the WARD dataset.

| Methods | Training | Testing | r = 1 | r = 5 | r = 10 | r = 20 |
|---|---|---|---|---|---|---|
| M-PCDL | A, B, C | A-B | 73.00 | 95.46 | 100.00 | 100.00 |
|  |  | A-C | 55.81 | 91.57 | 98.57 | 100.00 |
|  |  | B-C | 75.29 | 95.71 | 100.00 | 100.00 |
| M-CMDL | A, B, C | A-B | 68.07 | 91.43 | 97.14 | 100.00 |
|  |  | A-C | 50.93 | 87.57 | 95.71 | 100.00 |
|  |  | B-C | 71.43 | 92.42 | 100.00 | 100.00 |

As seen in Table 10, the proposed M-PCDL technique achieves the best Rank 1 matching results on all ranks for Cameras A-B, Cameras B-C, and Cameras A-C. This indicates that the proposed M-PCDL technique can be applied to multi-view cameras and demonstrates its advantage. Table 10 also shows that both the proposed M-PCDL technique and the M-CMDL technique achieve poorer performances for Camera A-C. A reason for this may be that there is a larger visual difference in the views between Camera A and Camera C compared with the difference in the views between Camera A and Camera B, and the difference in the views between Camera B and Camera C.

Calculation Time

The computing time the proposed PCDL technique can be investigated using the VIPeR dataset on a PC platform with 2.6 Hz CPU and 32 RAM, as an example. With these settings, the training phase 302 of the proposed PCDL technique can take about four hours to learn the projection matrices and the common dictionary. A larger size of the dataset increases the time needed for the training phase 302. In various aspects, the main computing time for the training phase 302 is spent on part-level representations. On the image-level, the training phase 302 of the proposed PCDL technique can take less than 20 minutes to complete. Other currently available methods usually need a larger amount of time and a larger amount of external datasets. For example, currently available deep learning methods which train a deep network usually need more than a week for training. The testing or execution phase 304 of the proposed PCDL technique, can take an average of 0.18 seconds to extract a feature from a test image, and can take an average of 1.34 seconds to match the test image with an image from the gallery set (e.g., to display the top 10 ranked images). Consequently, the proposed PCDL technique can satisfy practical applications that require fast (e.g., near real-time) person re-ID.

Figure 21:
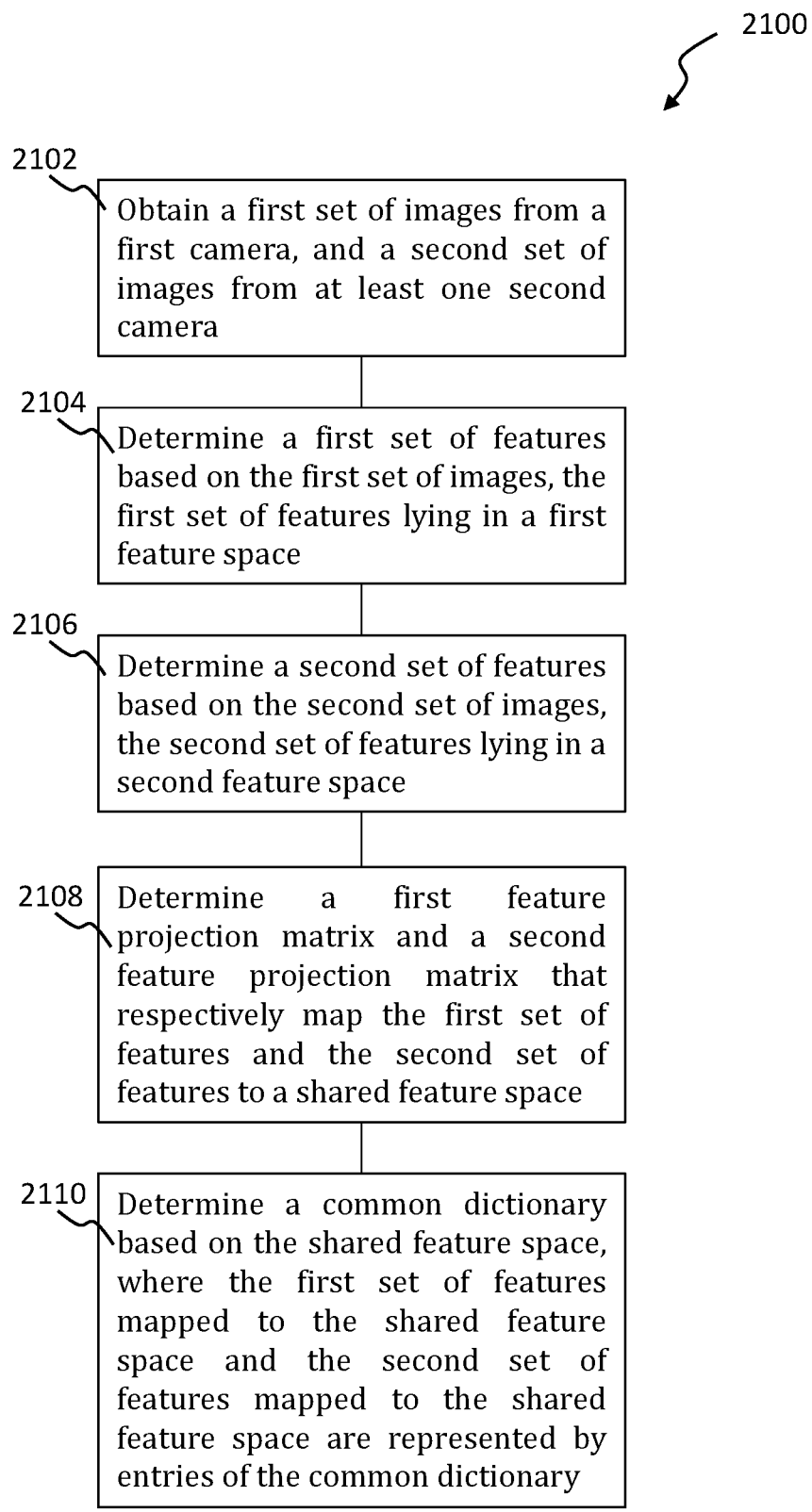
FIG. 21 shows a flowchart illustrating an example method for executing a training phase of the proposed PCDL technique, according to an implementation of the present disclosure.

FIG. 21 shows a flowchart illustrating an example method 2100 for executing a training phase of the proposed PCDL technique (e.g., the training phase 302 shown in FIG. 3A), according to an implementation of the present disclosure. The process 2100 may include additional or different operations, and the operations shown in FIG. 21 may be performed in the order shown or in another order. In some cases, one or more of the operations shown in FIG. 21 are implemented as processes that include multiple operations, sub-processes for other types of routines. In some cases, operations can be combined, performed in another order, performed in parallel, iterated or otherwise repeated or performed in another manner. The process 2100 may be performed by the computing system 110 shown in FIG. 1 (e.g., one or more processors of the computing system 110), or by another type of device.

At 2102, a first set of images (e.g., first image set 306-1 in FIG. 3A) is obtained from a first camera (e.g., camera 102-1 in FIG. 1), and a second set of images (e.g., second image set 306-2 in FIG. 3A) is obtained from at least one second, different camera (e.g., camera 102-2 in FIG. 1).

At 2104, a first set of features (e.g., feature descriptors 310-1 in FIG. 3A) is determined based on the first set of images, with the first set of features lying in a first feature space (e.g., feature space 312-1 in FIG. 3A).

At 2106, a second set of features (e.g., feature descriptors 310-2 in FIG. 3A) is determined based on the second set of images, with the second set of features lying in a second feature space (e.g., feature space 312-2 in FIG. 3A).

At 2108, a first feature projection matrix (e.g., matrix $P_1$ in FIG. 3A) and a second feature projection matrix (e.g., matrix $P_2$ in FIG. 3A) are determined. The first feature projection matrix and the second feature projection matrix respectively map the first set of features and the second set of features to a shared feature space (e.g., the shared feature space 314 in FIG. 3A).

At 2110, a common dictionary (e.g., the common dictionary 316 in FIG. 3A) is determined based on the shared feature space, where the first set of features mapped to the shared feature space and the second set of features mapped to the shared feature space are represented by entries (e.g., the K atoms of the common dictionary).

Figure 22:
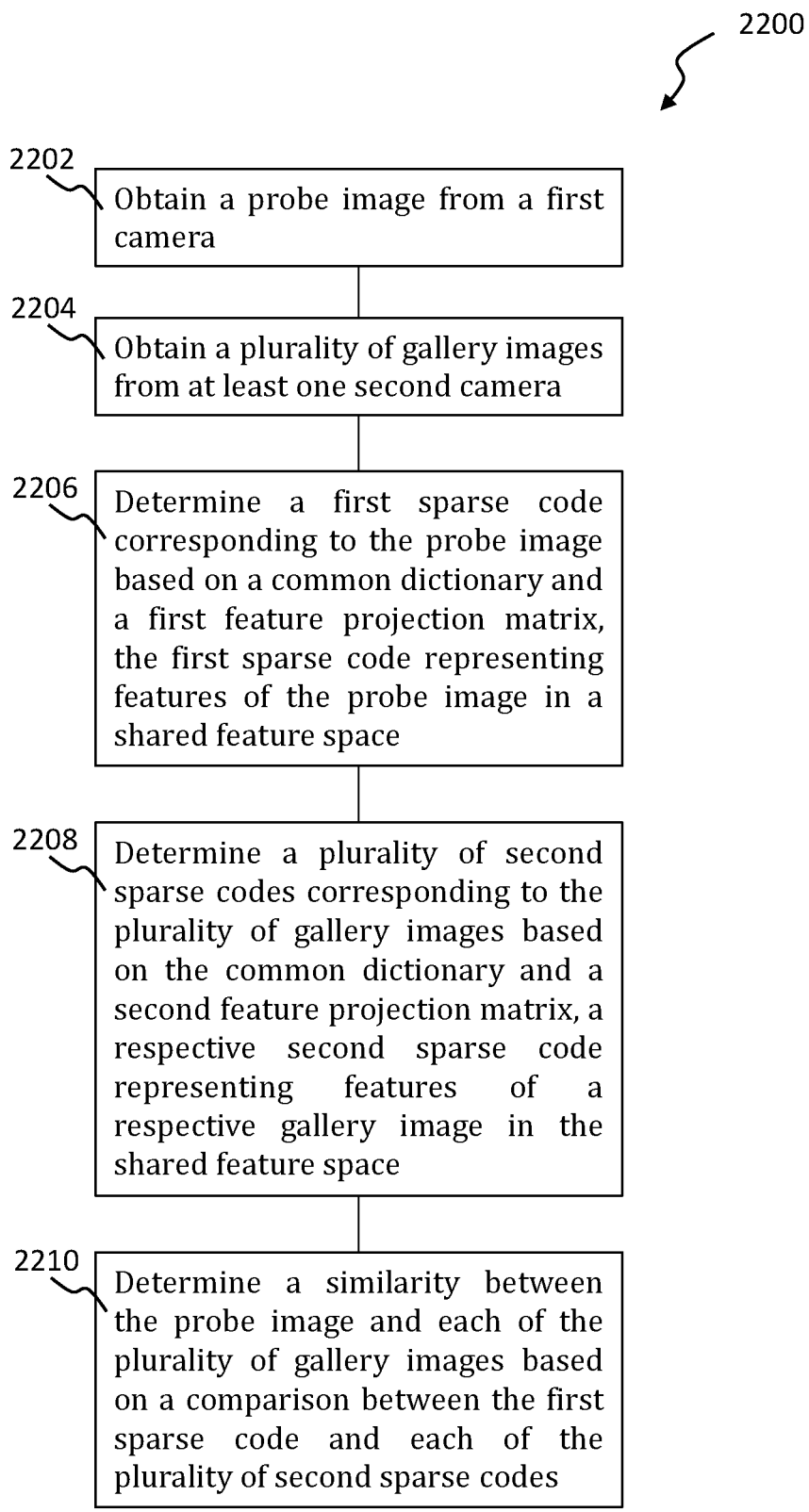
FIG. 22 shows a flowchart illustrating an example method for executing a testing phase of the proposed PCDL technique, according to an implementation of the present disclosure.

FIG. 22 shows a flowchart illustrating an example method 2200 for executing a testing phase of the proposed PCDL technique (e.g., the testing phase 304 shown in FIG. 3B), according to an implementation of the present disclosure. The process 2200 may include additional or different operations, and the operations shown in FIG. 22 may be performed in the order shown or in another order. In some cases, one or more of the operations shown in FIG. 22 are implemented as processes that include multiple operations, sub-processes for other types of routines. In some cases, operations can be combined, performed in another order, performed in parallel, iterated or otherwise repeated or performed in another manner. The process 2200 may be performed by the computing system 110 shown in FIG. 1 (e.g., one or more processors of the computing system 110), or by another type of device.

At 2202, a probe image (e.g., probe image 318 in FIG. 3B) is obtained from a first camera (e.g., probe camera in FIG. 3B).

At 2204, a plurality of gallery images (e.g., set of gallery images 320) is obtained from at least one second camera (e.g., gallery camera in FIG. 3B).

At 2206, a first sparse code corresponding to the probe image is obtained based on a common dictionary (e.g., the common dictionary 316 in FIG. 3B) and a first feature projection matrix (e.g., the matrix $P_j$ in FIG. 3B). The first sparse code can be used to represent features of the probe image in a shared feature space (e.g., the shared feature space 314 in FIG. 3A).

At 2208, a plurality of second sparse codes corresponding to the plurality of gallery images is obtained based on the common dictionary (e.g., the common dictionary 316 in FIG. 3B) and a second feature projection matrix (e.g., the matrix $P_i$ in FIG. 3B). A respective second sparse code can be used to represent features of a respective gallery image in the shared feature space.

At 2210, a similarity (e.g., similarity measure 324 in FIG. 3B) between the probe image and each of the plurality of gallery images is determined based on a comparison between the first sparse code and each of the plurality of second sparse codes.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, this disclosure relates to projection-based common dictionary learning from multiple cameras for object re-identification.

In a first example, a method (e.g., for re-identifying an object) includes obtaining a first set of images from a first camera, and a second set of images from at least one second camera, where the at least one second camera may be different from the first camera. The method further includes determining a first set of features based on the first set of images, the first set of features lying in a first feature space; and determining a second set of features based on the second set of images, the second set of features lying in a second feature space. The method additionally includes determining a first feature projection matrix and a second feature projection matrix that respectively map the first set of features and the second set of features to a shared feature space; and determining a common dictionary based on the shared feature space, where the first set of features mapped to the shared feature space and the second set of features mapped to the shared feature space are represented by entries of the common dictionary.

Implementations of the first example may include one or more of the following features. The second feature space may be different from the first feature space. The first set of features mapped to the shared feature space and the second set of features mapped to the shared feature space can be represented by respective linear combinations of the entries of the common dictionary. Determining the first set of features based on the first set of images may include: generating first-level representations (e.g., image-level representations) for the first set of images; generating second-level representations (e.g., part-level representations and/or patch-level representations) for the first set of images; determining first-level features (e.g., image-level features) for the first set of images based on the first-level representations; and determining second-level features (e.g. part-level features and/or patch-level features) for the first set of images based on the second-level representations, the first set of features including the first-level features for the first set of images and the second-level features for the first set of images. Determining the second set of features based on the second set of images may include: generating first-level representations (e.g., image-level representations) for the second set of images; generating second-level representations (e.g., part-level representations and/or patch-level representations) for the second set of images; determining first-level features (e.g., image-level features) for the second set of images based on the first-level representations; and determining second-level features (e.g., part level representations and/or patch-level representations) for the second set of images based on the second-level representations, the second set of features including the first-level features for the second set of images and the second-level features for the second set of images. Determining the first set of features based on the first set of images and determining the second set of features based on the second set of images may include determining at least one of color histograms, dense scale-invariant feature transform (SIFT) features, attributes, salient color features, mid-level feature maps, or polynomial kernel feature maps. The first example may further include: obtaining a probe image from the first camera; obtaining a plurality of gallery images from the at least one second camera; determining a first sparse code corresponding to the probe image based on the common dictionary and the first feature projection matrix, the first sparse code representing features of the probe image in the shared feature space; determining a plurality of second sparse codes corresponding to the plurality of gallery images based on the common dictionary and the second feature projection matrix, a respective second sparse code representing features of a respective gallery image in the shared feature space; and determining a similarity between the probe image and each of the plurality of gallery images based on a comparison between the first sparse code and each of the plurality of second sparse codes. The first example may further include: generating a ranked list based on the comparison between the first sparse code and each of the plurality of second sparse codes, the ranked list including an indication of a level of similarity between the probe image and each of the plurality of gallery images. The comparison between the first sparse code and each of the plurality of second sparse codes may be based on a Cosine similarity function. The number of entries of the common dictionary may be greater than or equal to 70.

In a second example, a non-transitory computer-readable medium stores instructions that are operable when executed by data processing apparatus to perform one or more operations of the first example. In a third example, a system includes a memory and at least one processor communicatively coupled to the memory and configured to perform operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method for object re-identification, the method comprising:
    obtaining a first set of images from a first camera, and a second set of images from at least one second camera, wherein the at least one second camera is different from the first camera;
    determining a first set of features based on the first set of images, the first set of features lying in a first feature space, wherein determining the first set of features based on the first set of images comprises:
        generating first-level representations for the first set of images, wherein the first-level representations for the first set of images comprise image-level representations for the first set of images;
        generating second-level representations for the first set of images, wherein the second-level representations for the first set of images comprise at least one of part-level representations for the first set of images or patch-level representations for the first set of images;
        determining first-level features for the first set of images based on the first-level representations, wherein the first-level features for the first set of images comprise image-level features for the first set of images; and
        determining second-level features for the first set of images based on the second-level representations, wherein the second-level features for the first set of images comprise at least one of part-level features for the first set of images or patch-level features for the first set of images, the first set of features comprising the first-level features for the first set of images and the second-level features for the first set of images;
    determining a second set of features based on the second set of images, the second set of features lying in a second feature space, wherein determining the second set of features based on the second set of images comprises:
        generating first-level representations for the second set of images, wherein the first-level representations for the second set of images comprise image-level representations for the second set of images;
        generating second-level representations for the second set of images, wherein the second-level representations for the second set of images comprise at least one of part-level representations for the second set of images or patch-level representations for the second set of images;
determining first-level features for the second set of images based on the first-level representations, wherein the first-level features for the second set of images comprise image-level features for the second set of images; and
determining second-level features for the second set of images based on the second-level representations, wherein the second-level features for the second set of images comprise at least one of part-level features for the second set of images or patch-level features for the second set of images, the second set of features comprising the first-level features for the second set of images and the second-level features for the second set of images;
determining a first feature projection matrix and a second feature projection matrix that respectively map the first set of features and the second set of features to a shared feature space; and
determining a common dictionary based on the shared feature space, wherein the first set of features mapped to the shared feature space and the second set of features mapped to the shared feature space are represented by entries of the common dictionary.

2. The method of claim 1, wherein the second feature space is different from the first feature space.

3. The method of claim 1, wherein the first set of features mapped to the shared feature space and the second set of features mapped to the shared feature space are represented by respective linear combinations of the entries of the common dictionary.

4. The method of claim 1, wherein determining the first set of features based on the first set of images and determining the second set of features based on the second set of images comprises determining at least one of color histograms, dense scale-invariant feature transform (SIFT) features, attributes, salient color features, mid-level feature maps, or polynomial kernel feature maps.

5. The method of claim 1, further comprising:
obtaining a probe image from the first camera;
obtaining a plurality of gallery images from the at least one second camera;
determining a first sparse code corresponding to the probe image based on the common dictionary and the first feature projection matrix, the first sparse code representing features of the probe image in the shared feature space;
determining a plurality of second sparse codes corresponding to the plurality of gallery images based on the common dictionary and the second feature projection matrix, a respective second sparse code representing features of a respective gallery image in the shared feature space; and
determining a similarity between the probe image and each of the plurality of gallery images based on a comparison between the first sparse code and each of the plurality of second sparse codes.

6. The method of claim 5, further comprising generating a ranked list based on the comparison between the first sparse code and each of the plurality of second sparse codes, the ranked list comprising an indication of a level of similarity between the probe image and each of the plurality of gallery images.

7. The method of claim 5, wherein the comparison between the first sparse code and each of the plurality of second sparse codes is based on a Cosine similarity function.

8. The method of claim 1, wherein a number of entries of the common dictionary is greater than or equal to 70.

9. A system for object re-identification, the system comprising:
a memory; and
at least one processor communicatively coupled to the memory and configured to perform operations comprising:
obtaining a first set of images from a first camera, and a second set of images from at least one second camera, wherein the at least one second camera is different from the first camera;
determining a first set of features based on the first set of images, the first set of features lying in a first feature space, wherein determining the first set of features based on the first set of images comprises:
generating first-level representations for the first set of images, wherein the first-level representations for the first set of images comprise image-level representations for the first set of images;
generating second-level representations for the first set of images, wherein the second-level representations for the first set of images comprise at least one of part-level representations for the first set of images or patch-level representations for the first set of images;
determining first-level features for the first set of images based on the first-level representations, wherein the first-level features for the first set of images comprise image-level features for the first set of images; and
determining second-level features for the first set of images based on the second-level representations, wherein the second-level features for the first set of images comprise at least one of part-level features for the first set of images or patch-level features for the first set of images, the first set of features comprising the first-level features for the first set of images and the second-level features for the first set of images;
determining a second set of features based on the second set of images, the second set of features lying in a second feature space, wherein determining the second set of features based on the second set of images comprises:
generating first-level representations for the second set of images, wherein the first-level representations for the second set of images comprise image-level representations for the second set of images;
generating second-level representations for the second set of images, wherein the second-level representations for the second set of images comprise at least one of part-level representations for the second set of images or patch-level representations for the second set of images;
determining first-level features for the second set of images based on the first level-representations, wherein the first-level features for the second set of images comprise image-level features for the second set of images; and
determining second-level features for the second set of images based on the second-level representations, wherein the second-level features for the second set of images comprise at least one of part-level features for the second set of images or patch-level features for the second set of images, the second set of features comprising the first-level features for the second set of images and the second-level features for the second set of images;

determining a first feature projection matrix and a second feature projection matrix that respectively map the first set of features and the second set of features to a shared feature space; and determining a common dictionary based on the shared feature space, wherein the first set of features mapped to the shared feature space and the second set of features mapped to the shared feature space are represented by entries of the common dictionary.

10. The system of claim 9, wherein the second feature space is different from the first feature space.

11. The system of claim 9, wherein the first set of features mapped to the shared feature space and the second set of features mapped to the shared feature space are represented by respective linear combinations of the entries of the common dictionary.

12. The system of claim 9, wherein determining the first set of features based on the first set of images and determining the second set of features based on the second set of images comprises determining at least one of color histograms, dense scale-invariant feature transform (SIFT) features, attributes, salient color features, mid-level feature maps, or polynomial kernel feature maps.

13. The system of claim 9, the operations further comprising:

obtaining a probe image from the first camera;

obtaining a plurality of gallery images from the at least one second camera;

determining a first sparse code corresponding to the probe image based on the common dictionary and the first feature projection matrix, the first sparse code representing features of the probe image in the shared feature space;

determining a plurality of second sparse codes corresponding to the plurality of gallery images based on the common dictionary and the second feature projection matrix, a respective second sparse code representing features of a respective gallery image in the shared feature space; and determining a similarity between the probe image and each of the plurality of gallery images based on a comparison between the first sparse code and each of the plurality of second sparse codes.

14. The system of claim 13, the operations further comprising generating a ranked list based on the comparison between the first sparse code and each of the plurality of second sparse codes, the ranked list comprising an indication of a level of similarity between the probe image and each of the plurality of gallery images.

15. The system of claim 13, wherein the comparison between the first sparse code and each of the plurality of second sparse codes is based on a Cosine similarity function.

16. A non-transitory computer-readable medium comprising instructions that are operable, when executed by a data processing apparatus, to perform operations comprising:

obtaining a first set of images from a first camera, and a second set of images from at least one second camera, wherein the at least one second camera is different from the first camera;

determining a first set of features based on the first set of images, the first set of features lying in a first feature space, wherein determining the first set of features based on the first set of images comprises:

generating first-level representations for the first set of images, wherein the first-level representations for the first set of images comprise image-level representations for the first set of images;

generating second-level representations for the first set of images, wherein the second-level representations for the first set of images comprise at least one of part-level representations for the first set of images or patch-level representations for the first set of images;

determining first-level features for the first set of images based on the first-level representations, wherein the first-level features for the first set of images comprise image-level features for the first set of images; and determining second-level features for the first set of images based on the second-level representations, wherein the second-level features for the first set of images comprise at least one of part-level features for the first set of images or patch-level features for the first set of images, the first set of features comprising the first-level features for the first set of images and the second-level features for the first set of images;

determining a second set of features based on the second set of images, the second set of features lying in a second feature space, wherein determining the second set of features based on the second set of images comprises:

generating first-level representations for the second set of images, wherein the first-level representations for the second set of images comprise image-level representations for the second set of images;

generating second-level representations for the second set of images, wherein the second-level representations for the second set of images comprise at least one of part-level representations for the second set of images or patch-level representations for the second set of images;

determining first-level features for the second set of images based on the first-level representations, wherein the first-level features for the second set of images comprise image-level features for the second set of images; and determining second-level features for the second set of images based on the second-level representations, wherein the second-level features for the second set of images comprise at least one of part-level features for the second set of images or patch-level features for the second set of images, the second set of features comprising the first-level features for the second set of images and the second-level features for the second set of images;

determining a first feature projection matrix and a second feature projection matrix that respectively map the first set of features and the second set of features to a shared feature space; and determining a common dictionary based on the shared feature space, wherein the first set of features mapped to the shared feature space and the second set of features mapped to the shared feature space are represented by entries of the common dictionary.

* * * * *